United States Patent
Iseda et al.

(10) Patent No.: US 9,773,582 B2
(45) Date of Patent: Sep. 26, 2017

(54) CONDUCTIVE COMPOSITION AND CONDUCTIVE MOLDED BODY

(71) Applicant: MITSUBOSHI BELTING LTD., Kobe-shi, Hyogo (JP)

(72) Inventors: Taisuke Iseda, Hyogo (JP); Masahiro Iwamoto, Hyogo (JP)

(73) Assignee: MITSUBOSHI BELTING LTD., Hyogo (JP)

( * ) Notice: Subject to any disclaimer, the term of this patent is extended or adjusted under 35 U.S.C. 154(b) by 102 days.

(21) Appl. No.: 14/430,406

(22) PCT Filed: Jan. 11, 2013

(86) PCT No.: PCT/JP2013/050490
§ 371 (c)(1),
(2) Date: Mar. 23, 2015

(87) PCT Pub. No.: WO2014/050155
PCT Pub. Date: Apr. 3, 2014

(65) Prior Publication Data
US 2015/0247067 A1    Sep. 3, 2015

(30) Foreign Application Priority Data

Sep. 27, 2012 (JP) ................. 2012-215007
Nov. 16, 2012 (JP) ................. 2012-252057

(51) Int. Cl.
*H01B 1/22* (2006.01)
*C08K 3/08* (2006.01)
*C09J 9/02* (2006.01)
*C09J 163/00* (2006.01)

(52) U.S. Cl.
CPC ............. *H01B 1/22* (2013.01); *C08K 3/08* (2013.01); *C09J 9/02* (2013.01); *C09J 163/00* (2013.01); *C08K 2003/0806* (2013.01); *C08K 2201/001* (2013.01); *C08K 2201/002* (2013.01); *Y10T 428/31515* (2015.04)

(58) Field of Classification Search
CPC ... C09J 9/02; C09J 63/00; C08L 63/00; C08G 59/32; C08K 3/08; C08K 2201/001; C08K 2201/002; C08K 2003/0806; H01B 1/22; Y10T 428/31515
See application file for complete search history.

(56) References Cited

U.S. PATENT DOCUMENTS

| | | | |
|---|---|---|---|
| 4,356,505 | A | 10/1982 | Lovinger et al. |
| 4,929,594 | A | 5/1990 | Gopalakrishnan et al. |
| 5,219,833 | A | 6/1993 | Gopalakrishnan et al. |
| 9,337,362 | B2 | 5/2016 | Dong |
| 2004/0055894 | A1* | 3/2004 | Iwasaki ........... C25D 11/32 205/157 |
| 2012/0119153 | A1 | 5/2012 | Choi |
| 2013/0252372 | A1 | 9/2013 | Dong |

FOREIGN PATENT DOCUMENTS

| | | |
|---|---|---|
| CN | 102467989 | 5/2012 |
| EP | 2 455 947 | 5/2012 |
| JP | 11-106806 | 4/1999 |
| JP | 2003-055701 | 2/2003 |
| JP | 2004-183010 | 7/2004 |
| JP | 2004-221006 | 8/2004 |
| JP | 2004-355933 | 12/2004 |
| JP | 2006-063414 | 3/2006 |
| JP | 2006-111903 | 4/2006 |
| JP | 2007-254845 | 10/2007 |
| JP | 2008-171828 | 7/2008 |
| JP | 2008-177463 | 7/2008 |
| JP | 2008-184599 | 8/2008 |
| JP | 2009-074171 | 4/2009 |
| JP | 2009-144188 | 7/2009 |
| JP | 2010-043228 | 2/2010 |
| JP | 2010-202943 | 9/2010 |
| JP | 2010-229544 | 10/2010 |
| JP | 2010-236039 | 10/2010 |
| JP | 2011-071057 | 4/2011 |
| JP | 2011-100573 | 5/2011 |
| JP | 2011-187194 | 9/2011 |
| JP | 2012-062531 | 3/2012 |
| JP | 2012-092442 | 5/2012 |
| TW | 151817 | 2/1991 |
| TW | 201218212 | 5/2012 |
| WO | 2012/086588 | 6/2012 |

OTHER PUBLICATIONS

Wong, C.P.; Polymers for Electronic and Photonic Applications, 1993, p. 287-331.*
Kudo YDCN-500-90P Product Data Sheet, 2004, p. 1-2.*
Hara, O.; ThreeBond Technical News, 1990, vol. 20, p. 1-10.*
Office Action issued in corresponding Japanese Patent Application No. 2012-252057, drafted on Sep. 4, 2015 and dated Sep. 8, 2015, 9 pages with an English translation.
Office Action issued in corresponding Chinese Application No. 201380050937.3, dated Feb. 3, 2016, 20 pages with an English translation.
Extended European Search Report issued in corresponding European Application No. 13842507.9, dated Mar. 7, 2016, 7 pages.
Notification of Reasons for Refusal issued in corresponding Japanese Patent Application No. 2012-252057 on Jun. 2, 2015 (4 pages) and English translation.
Office Action issued in corresponding Taiwanese Patent Application No. 102103201, dated Jun. 15, 2016, 6 pages with translation.
Guangyu Li, et al., Handbook of Adhesive Raw Materials (1st edition), National Defense Industry Press, p. 26, Aug. 31, 2004, 4 pages with translation.
Office Action issued in corresponding Chinese Patent Application, dated Sep. 21, 2016, 14 pages with translation.

* cited by examiner

*Primary Examiner* — Robert Jones, Jr.
(74) *Attorney, Agent, or Firm* — Hamre, Schumann, Mueller & Larson, P.C.

(57) ABSTRACT

The present invention relates to a conductive composition containing a conductive metal powder and an epoxy resin component in which the conductive metal powder contains a metal flake and the epoxy resin component contains a polyfunctional epoxy resin having three or more epoxy groups.

15 Claims, No Drawings

CONDUCTIVE COMPOSITION AND CONDUCTIVE MOLDED BODY

TECHNICAL FIELD

The present invention relates to a conductive composition useful for forming conductive adhesives, electrodes or the like and a molded body (conductive molded body) containing a conductive region (conductive adhesive layer, electrode, wiring, etc.) formed of the conductive composition.

BACKGROUND ART

Conductive compositions (conductive pastes) containing a conductive metal powder (conductive filler) such as a silver paste have been used for forming electrodes or circuits of electronic components. Of these, in the conductive paste containing a thermoplastic or thermosetting resin, usually, conductivity is realized by the contact of conductive fillers one another resulting from the shrinkage of the used resin, and also close contact or adhesiveness to a base material is secured by the presence of the resin. Therefore, in the conductive paste containing such a binder, in order to obtain sufficient conductivity, it is important to increase the contact area between the conductive metal powders. From this point of view, as the conductive metal powder, an attempt of using a metal flake (a flaky metal powder) has been made.

For example, Patent Document 1 discloses a conductive paste containing a flaky silver powder and an organic resin. The document exemplifies, as the organic resin, a wide range of organic resins such as polyester resins, modified polyester resins (urethane-modified polyester resins etc.), polyether-urethane resins, polycarbonate-urethane resins, vinyl chloride-vinyl acetate copolymers, epoxy resins, phenolic resins, acrylic resins, polyamideimides, nitrocellulose, cellulose acetate butyrate, and cellulose acetate propionate. In particular, polyester resins and urethane-modified polyester resins are used in Examples from the viewpoints of bending resistance and the like.

Moreover, Patent Document 2 discloses a flaky silver powder in which the average particle diameter and the BET specific surface area have a specific relationship. In this document, as the resin used in the conductive paste, there are exemplified epoxy resins, acrylic resins, polyester resins, polyimide resins, polyurethane resins, phenoxy resins, silicone resins, and the like and polyester resins are used in Examples.

In such a situation, a further improvement in conductivity and adhesiveness has been desired.

BACKGROUND ART DOCUMENTS

Patent Documents

Patent Document 1: JP-A-2008-171828
Patent Document 2: JP-A-2012-92442

SUMMARY OF THE INVENTION

Problems that the Invention is to Solve

Accordingly, an object of the present invention is to provide a conductive composition which can realize excellent conductivity even when an organic resin is contained and a molded body having a conductive region formed of the conductive composition.

Another object of the present invention is to provide a conductive composition which can improve or enhance conductivity without impairing close contact or adhesiveness to a base material and a molded body having a conductive region formed of the conductive composition.

Yet another object of the present invention is to provide a conductive adhesive having excellent conductivity and heat radiation property and a molded body having a conjugated base material directly bonded by the conductive adhesive.

Means for Solving the Problems

As a result of intensive studies for solving the above problems, the present inventors have found that by combining a specific epoxy resin among resins as binders with a metal flake (flaky metal powder) in a conductive composition, high conductivity can be achieved, also excellent close contact or adhesiveness to a base material can be both achieved in spite of such high conductivity, and further, sufficient conductivity and heat radiation property (and furthermore, close contact) can be secured even in the conductive adhesive application or the like where high heat radiation property is required. Thus, they have accomplished the present invention.

That is, the present invention provides a conductive composition containing a conductive metal powder and an epoxy resin component, in which the conductive metal powder contains a metal flake and the epoxy resin component contains a polyfunctional epoxy resin having three or more epoxy groups.

In the metal flake, the average particle diameter thereof may be 0.7 to 10 μm, the BET specific surface area thereof may be 1 to 5 m$^2$/g, and the tap density thereof may be 0.5 to 4.5 g/cm$^3$. Further, when the average particle diameter of the metal flake is taken as A (μm) and the BET specific surface area thereof is taken as B (m$^2$/g), the value of A×B$^2$ may satisfy 4 to 30. Typically, when the metal flake has an average particle diameter of 0.5 to 3.5 μm, a BET specific surface area of 1 to 4.5 m$^2$/g and a tap density of 1.2 to 3.5 g/cm$^3$ and, when the average particle diameter of the metal flake is taken as A (μm) and the BET specific surface area thereof is taken as B (m$^2$/g), the value of A×B$^2$ may satisfy 4.5 to 25.

The metal flake may be a flaked product of an aggregated powder of a spherical metal fine particle (particularly, a metal nanoparticle).

The conductive metal powder may further contain another conductive metal powder (e.g., a spherical metal nanoparticle, etc.). The ratio of such the metal flake to another conductive metal powder (e.g., a spherical metal nanoparticle, etc.) may be, for example, as follows: the former/the latter (weight ratio)=approximately 99/1 to 50/50.

In the conductive composition according to the present invention, the polyfunctional epoxy resin may be, for example, an aromatic epoxy resin. Further, the polyfunctional epoxy resin may have an epoxy equivalent of 350 g/eq or less (e.g., 300 g/eq or less). In particular, the polyfunctional epoxy resin may be a glycidyl ether type aromatic epoxy resin (e.g., a novolak type epoxy resin, a tri- to octa-(glycidyloxyaryl) alkane, a compound in which poly(glycidyloxy)naphthalenes are directly combined or linked via a linking group (e.g., an alkylene group such as methylene group or ethylene group, an alkylidene group, etc.), etc.) having an epoxy equivalent of 140 to 320 g/eq (e.g., 150 to 310 g/eq, preferably 160 to 300 g/eq, etc.).

The epoxy resin component may typically contain a curing agent (particular, a curing agent composed of an aromatic amine-based curing agent).

In the conductive composition according to the present invention, the ratio of the conductive metal powder to the epoxy resin component may be, for example, as follows: the former/the latter (weight ratio)=approximately 99/1 to 50/50.

The conductive composition according to the present invention may be a conductive adhesive (e.g., a die bond paste, etc.). In a more specific embodiment, it may be a conductive adhesive (a die bond paste) for bonding a lead frame [e.g., a lead frame formed of a metal (copper, a copper alloy, or the like), a lead frame formed of a metal and further plated, etc.] with a semiconductor chip (e.g., a semiconductor base material, or a semiconductor chip in which a metal film is formed on a semiconductor base material). In this connection, in the case of the semiconductor chip on which a metal film is formed, it may be used as a conductive adhesive for bonding a lead frame with the metal film of the semiconductor chip.

The present invention further provides a molded body (conductive molded body) having at least a conductive region (or a conductive film) formed of the conductive composition described above. Such a molded body may be a molded body containing a conjugated base material composed of two base materials and a conductive adhesive that intervenes between the base materials and bonds the two base materials each other, in which the conductive adhesive is formed of the conductive composition described above. Such a molded body may be composed of, for example, a base material (a lead frame, etc.) formed of a metal, another base material (a semiconductor chip, etc.) formed of a semiconductor, and the conductive composition described above that intervenes between these base materials and bonds them each other.

Advantage of the Invention

The conductive composition of the present invention can realize excellent conductivity although it contains a resin component as a binder. Moreover, such an improvement or enhancement in conductivity can be realized without impairing close contact or adhesiveness to a base material. Furthermore, since the conductive composition of the invention is excellent in conductivity and heat radiation property (thermal conductivity) and further sufficient close contact can be secured, it is particularly useful as a conductive adhesive.

MODE FOR CARRYING OUT THE INVENTION

<Conductive Composition>

The conductive composition of the present invention is composed of a specific conductive metal powder and a specific epoxy resin component.

[Conductive Metal Powder]

The conductive metal powder contains at least a metal flake (a flaky metal powder, a plate-shaped metal powder, a scale-shaped metal powder).

(Metal Flake)

Examples of the metal (metal atom) constituting the metal flake include transition metals (e.g., Group 4 metals of the periodic table such as titanium and zirconium; Group 5 metals of the periodic table such as vanadium and niobium; Group 6 metals of the periodic table such as molybdenum and tungsten; Group 7 metals of the periodic table such as manganese and rhenium; Groups 8 to 10 metals of the periodic table such as iron, nickel, cobalt, ruthenium, rhodium, palladium, iridium, and platinum; Group 11 metals of the periodic table such as copper, silver, and gold; etc.), Group 12 metals of the periodic table (e.g., zinc, cadmium, etc.), Group 13 metals of the periodic table (e.g., aluminum, gallium, indium, etc.), Group 14 metals of the periodic table (e.g., germanium, tin, lead, etc.), Group 15 metals of the periodic table (e.g., antimony, bismuth, etc.), and the like. The metals may be used singly or in combination of two or more thereof.

Typical metals include Groups 8 to 10 metals of the periodic table (iron, nickel, rhodium, palladium, platinum, etc.), Group 11 metals of the periodic table (copper, silver, gold, etc.), Group 13 metals of the periodic table (aluminum etc.), Group 14 metals of the periodic table (tin, etc.), and the like.

The metals may be metal simple substances and also in the form of metal alloys or compounds of metals and non-metals (e.g., metal oxides, metal hydroxides, metal sulfides, metal carbides, metal nitrides, metal borides, etc.). Usually, the metal is a metal simple substance or a metal alloy in many cases.

In particular, the metal is preferably a metal (e.g., a metal simple substance or a metal alloy) containing at least a noble metal (particularly, Group 11 metal of the periodic table) such as silver, and particularly a noble metal simple substance (e.g., silver simple substance, etc.).

These metal flakes can be used alone or in combination of two or more thereof.

The form of the metal flake is important in order to improve or enhance desired characteristics (conductivity, thermal conductivity, adhesiveness, etc.) of the present invention. For example, the average particle diameter of the metal flake can be selected from the range of approximately 0.1 to 20 μm and may be, for example, approximately 0.3 to 15 μm (e.g., 0.5 to 12 μm), preferably 0.7 to 10 μm (e.g., 0.8 to 7 μm), more preferably 0.9 to 6 μm (e.g., 1 to 5.5 μm), usually 1 to 5 μm (e.g., 1.1 to 4.5 μm) and particularly, may be approximately 4 μm or less (e.g., 0.5 to 3.5 μm, preferably 0.7 to 3 μm, more preferably 0.8 to 2.5 μm, and usually 1 to 2 μm). When the average particle diameter is too small, there are cases where the aspect ratio of the flake decreases and a sufficient contact area is not obtained. When it is too large, it is possible to increase the contact area but, when a conductive composition is formed, sufficient conductivity and thermal conductivity cannot rather be obtained in some cases probably because the flakes precipitate with time and become heterogeneous in the conductive composition and the concentration gradient is liable to occur when the composition is applied to a base material.

The average particle diameter of the metal flake can be measured, for example, by using a laser diffraction scattering particle size distribution measuring method or the like. In such a measuring method, the average particle diameter (median particle diameter) is measured as a value based on volume.

Moreover, the BET specific surface area of the metal flake can be selected from the range of approximately 0.3 to 7 $m^2/g$ and may be, for example, approximately 0.5 to 6 $m^2/g$ (e.g., 0.7 to 5.5 $m^2/g$), preferably 1 to 5 $m^2/g$ (e.g., 1.1 to 4.5 $m^2/g$), more preferably 1.2 to 4 $m^2/g$ (e.g., 1.2 to 3.5 μm), particularly 1.3 to 3.2 $m^2/g$ (e.g., 1.4 to 3 $m^2/g$) and may be usually approximately 0.8 to 5.5 $m^2/g$ (e.g., 0.9 to 5 $m^2/g$, preferably 1 to 4.5 $m^2/g$, and more preferably 1.1 to 4 $m^2/g$). When the specific surface area is too small, there are cases where the contact points between the metal flakes decrease and thus sufficient conductivity is not obtained. When it is too large, the tap density to be mentioned below is liable to decrease, so that conductivity and thermal conductivity relatively decrease in some cases.

Incidentally, in the above Patent Document 2, when the average particle diameter of the metal flake is taken as A (μm) and the BET specific surface area thereof is taken as B m²/g, in order to obtain high conductivity, the value of $A^2 \times B$ is required to be a value exceeding 50. That is, for conductivity and thermal conductivity, it assumes that the average particle diameter contributes significantly.

However, according to the investigation of the present inventors, in the combination with a specific curable component (polyfunctional epoxy resin component) to be mentioned later, in order to obtain high conductivity and thermal conductivity and further sufficient adhesiveness to a base material, it has been found that the contribution of the BET specific surface area is larger than that of the average particle diameter.

Specifically, when the average particle diameter of the metal flake is taken as A (μm) and the BET specific surface area thereof is taken as B (m²/g), the value of $A \times B^2$ can be selected from the range of 1 to 50 (e.g., approximately 2 to 45) and may be, for example, approximately 2.5 to 40 (e.g., 3 to 35), preferably 4 to 30 (e.g., 4.5 to 25), more preferably 5 to 20 (e.g., 5.5 to 18), particularly 6 to 15 (e.g., 7 to 14) and may usually satisfy 5 to 12 (e.g., 6 to 11.5, and preferably 6.5 to 11). In particular, the value of $A \times B^2$ may be approximately 4 to 25, preferably 4.5 to 22, and more preferably 4.5 to 20 (e.g., 6 to 19).

Moreover, the tap density of the metal flake is also important for conductivity. The tap density of the metal flake can be selected from the range of approximately 0.1 to 7 g/cm³ (e.g., approximately 0.2 to 6 g/cm³) and may be, for example, approximately 0.3 to 5.5 g/cm³ (e.g., 0.4 to 5 g/cm³), preferably 0.5 to 4.5 g/cm³ (e.g., 0.6 to 4.2 g/cm³), more preferably 0.8 to 4 g/cm³ (e.g., 1 to 3.7 g/cm³), particularly 1.2 to 3.5 g/cm³ (e.g., 1.5 to 3.2 g/cm³) and may be usually 1.5 to 4 g/cm³ (e.g., 2 to 3.5 g/cm³). When the tap density is too small, there are case where filling ability decreases and thus sufficient conductivity and thermal conductivity are not obtained or the amount of a solvent increases at the time when the conductive composition is converted into a paste and thus voids are liable to form after application. On the other hand, when the tap density is too large, sufficient conductivity and thermal conductivity cannot rather be obtained in some cases probably because the precipitation rate of the metal flake in the conductive composition increases so that the flakes precipitate with time and become heterogeneous in the conductive composition and the concentration gradient is liable to occur when the composition is applied to a base material.

Incidentally, the average thickness of the metal flake may be, for example, 10 to 1,000 nm, preferably 20 to 500 nm, and more preferably 50 to 300 nm. The aspect ratio of the metal flake (average particle diameter/average thickness) may be, for example, approximately 5 to 100, preferably 7 to 50, and more preferably 10 to 30.

As the metal flake, use can be made of a commercially available product or one synthesized by a conventional method [e.g., (i) a method of flaking (flattening) a metal fine particle (spherical fine particle) (e.g., methods described in Patent Documents 1 and 2), (ii) a method of growing (crystal-growing) a metal (crystal) in a flake shape (two-dimensionally) (e.g., methods described in JP-A-11-106806, JP-A-2004-183010, JP-A-2006-111903, JP-A-2009-144188, etc.)].

Since the flake is made physically in the method (i), fine irregularities are easily formed on the metal surface. Since the flake is made by crystal growth in the method (ii), the metal surface tends to be relatively smooth.

In the present invention, the metal flake obtained by the method (i) [i.e., a flaked product (metal flake obtained by flaking a metal fine particle) of the metal fine particle (or an aggregated powder of the metal fine particle)] may be suitably used. In such a metal flake, conductivity and thermal conductivity seem to be easily enhanced probably because sufficient contact between metal flakes is secured by the fine irregularities present on the surface as described above.

Such a flaked product of a metal fine particle can be obtained by, for example, flaking treatment (or flattening treatment) of the metal fine particle by a flaking or flattening means (a ball mill etc.). As the metal fine particle used in the flaking treatment, use can be made of a commercial product or use can be also made of one synthesized by a conventional method [e.g., a method of reducing a metal compound (metal compound corresponding to the above metal) in a liquid phase].

The shape of the metal fine particle is not particularly limited, but is usually spherical (or almost spherical). Moreover, the metal fine particle (or the aggregated powder of the metal fine particle) has an average particle diameter (or average primary particle diameter or average particle diameter of the metal fine particle constituting the aggregated powder) which can be appropriately selected depending on the desired metal flake, but may be substantially nano-sized and may be, for example, approximately 1 to 800 nm (e.g., 2 to 700 nm), preferably 3 to 500 nm (e.g., 5 to 400 nm), and more preferably 5 to 300 nm (e.g., 10 to 200 nm). When such a metal fine particle (or the aggregated powder thereof) is used, a metal flake having characteristics as described above (average particle diameter etc.) can be easily obtained.

Incidentally, as commercially available products of the metal fine particle (or the aggregated powder thereof), there may be mentioned Silvest C-34, Silvest H-1 and Silvest E-20 manufactured by Tokuriki Chemical Research Co., Ltd., ST-M and SPH02J manufactured by Mitsui Mining and Smelting Co., Ltd., G-13, G-35 and GS-36 manufactured by DOWA Hightech Co., Ltd., and AgC-101, AgC-111, AgC-114, AgC-141, AgC-152, AgC-153, and AgC-154 manufactured by Fukuda Metal Foil & Powder Co., Ltd., and the like.

In the case of producing the metal fine particle (or the aggregated powder thereof) and the metal flake, there may be utilized methods described in, for example, JPA-2003-55701, JP-A-2006-63414, JP-A-2007-254845, JP-A-2008-171828, JP-A-2009-074171, JP-A-2010-202943, JP-A-2010-236039, JP-A-2010-229544, JP-A-2011-071057, JPA-2011-100573, JP-A-2012-062531, and the like.

The flaking treatment can be appropriately adjusted so as to achieve the characteristics (average particle diameter, BET specific surface area, tap density, etc.) as described above.

(Other Metal Powder)

The conductive metal powder sufficiently contains at least the metal flake and may contain another metal powder (conductive metal powder) within the range where the effects of the present invention are not impaired. As the other metal powder, there may be mentioned metal powders such as non-flaky metal powders, for example, spherical (or almost spherical), fibrous metal powders, and the like. The metal constituting the other metal powder is the same as the metal as described in the section of the metal flake. The metal flake and the other metal powder may be the same or different in constituent metal. The other metal powder may be used singly or in combination of two or more thereof.

In particular, the conductive metal powder may contain a spherical metal fine particle (conductive metal fine particle). The combination of the metal flake and the spherical metal fine particle may further improve or enhance the conductivity and thermal conductivity in some cases. Normally, the metal fine particle (spherical metal fine particle) may be nano-sized. The average particle diameter of such the nano-sized metal fine particle (metal nanoparticle) may be, for example, approximately 1 to 800 nm (e.g., 2 to 600 nm), preferably 3 to 500 nm (e.g., 5 to 300 nm), more preferably 5 to 200 nm (e.g., 10 to 150 nm). Further, the ratio (proportion) of the average particle diameter of the metal flake to the average particle diameter of the metal fine particle (in particular, metal nanoparticle) can be selected from the range of the former/the latter=approximately 1/1 to 20,000/1 (e.g., 1.5/1 to 5,000/1) and may be, for example, approximately 2/1 to 3,000/1 (e.g., 3/1 to 2,000/1), preferably 4/1 to 1,000/1 (e.g., 5/ to 750/1), and more preferably 7/1 to 500/1 (e.g., 10/1 to 100/1).

The ratio of the metal flake to the other metal powder (in particular, the spherical metal fine particle) can be selected from the range of the former/the latter=approximately 99.9/0.1 to 20/80 (e.g., 99.5/0.5 to 30/70) and may be, for example, approximately 99/1 to 40/60 (e.g., 99/1 to 50/50), preferably 98/2 to 60/40 (e.g., 97/3 to 70/30), and more preferably 95/5 to 75/25 (e.g., 95/5 to 80/20).

[Epoxy Resin Component]

The epoxy resin component (sometimes simply referred to as resin component) in the conductive composition of the present invention contains a polyfunctional epoxy resin having three or more epoxy groups (sometimes simply referred to as polyfunctional epoxy resin).

(Polyfunctional Epoxy Resin)

In the polyfunctional epoxy resin, the number of epoxy groups is sufficiently three or more and may be, for example, 3 to 150 (e.g., 3 to 120), preferably 3 to 100 (e.g., 3 to 80), and more preferably 3 to 50 (e.g., 3 to 30).

Furthermore, the polyfunctional epoxy resin may be, for example, any of glycidyl ether type, glycidyl amine type, glycidyl ester type, alicyclic type (an epoxy resin having an epoxycycloalkane skeleton), and the like.

A specific polyfunctional epoxy resin is not particularly limited as long as it has three or more epoxy groups and may be, for example, any of aliphatic epoxy resins (e.g., tri- to hexa-glycidyl ethers of alkane-tri- to hexa-ols, such as trimethylolpropane triglycidyl ether, glycerin triglycidyl ether, pentaerythritol tri- or tetra-glycidyl ether, etc.), alicyclic epoxy resins [e.g., tri- to hexa-esters of alkane-tri- to hexa-ols with epoxycycloalkane carboxylic acids, such as triester of 2,2-bis(hydroxymethyl)-1-butanol with 3,4-epoxycyclohexane carboxylic acid, etc.], aromatic epoxy resins, nitrogen-containing type epoxy resins (e.g., triglycidyl isocyanurate etc.), and the like.

The polyfunctional epoxy resin is typically preferably composed of an alicyclic epoxy resin or an aromatic epoxy resin and, in particular, is preferably composed of an aromatic epoxy resin.

Examples of the aromatic epoxy resin include glycidyl ether type aromatic epoxy resins (e.g., novolak type epoxy resins, tri- to octa-(glycidyloxyaryl)alkanes [e.g., tri- to hexa-(glycidyloxyphenyl)-$C_{1-10}$-alkanes such as 1,1,2,2-tetrakis(4-glycidyloxyphenyl) ethane and 1,1,1-tris(glycidyloxyphenyl)methane], compounds in which poly(glycidyloxy) naphthalenes [e.g., diglycidyloxynaphthalenes such as 1,5-di(glycidyloxy)naphthalene, 1,6-di(glycidyloxy)naphthalene, 2,6-di(glycidyloxy)naphthalene, 2,7-di(glycidyloxy) naphthalene, and 2,7-di(2-methyl-2,3-epoxypropyloxy)naphthalene; 2,2'-diglycidyloxy binaphthalene, etc.] are directly combined or linked via a linking group (e.g., an alkylene group such as methylene group or ethylene group, an alkylidene group, etc.) [e.g., poly(diglycidyloxynaphthyl)-$C_{1-10}$-alkanes such as 1,1'-methylenebis(2,7-diglycidyloxynaphthalene) or bis(2,7-diglycidyloxynaphthyl) methane], glycidyl amine type aromatic epoxy resins (e.g., tetra- to octa-glycidyl polyamines such as tetraglycidyl diaminodiphenylmethane and tetraglycidyl-meta-xylylenediamine; triglycidyl-para-aminophenol; N,N-diglycidyl-4-glycidyloxyaniline (or N,N-bis(2,3-epoxypropyl)-4-(2,3-epoxypropoxy)aniline), etc.), and the like.

As the novolak type epoxy resin, there may be mentioned glycidyl etherified compounds of novolak resins using a phenolic compound as a polymerization component. In such novolak type epoxy resins, as the phenolic compound (compound having a phenolic hydroxyl group), there may be mentioned phenols [e.g., phenol; substituted phenols such as alkylphenols (e.g., $C_{1-20}$-alkylphenols, preferably $C_{1-12}$-alkylphenol, more preferably $C_{1-4}$-alkylphenols, such as cresol, ethylphenol, s-butylphenol, t-butylphenol, 1,1,3,3-tetramethylbutylphenol, decylphenol, and dodecylphenol), and aralkylphenols (e.g., $C_{6-10}$-aryl-$C_{1-10}$-alkylphenols such as 1,1-dimethyl-1-phenylmethylphenol)], naphthols (e.g., naphthol etc.), bisphenols [e.g., biphenol; bis(hydroxyphenyl)-$C_{1-10}$-alkanes such as bisphenol A, bisphenol B, bisphenol E, and bisphenol F; bis(hydroxy-$C_{1-10}$-alkylphenyl)-$C_{1-10}$-alkanes such as 2,2-bis(3-methyl-4-hydroxyphenyl) propane and bisphenol G; bis(hydroxy-$C_{6-10}$-arylphenyl)-$C_{1-10}$-alkanes such as bisphenol PH; bis(hydroxyphenyl)-$C_{5-10}$-cycloalkanes such as bisphenol Z and bisphenol TMC; bisphenol AP, bisphenol BP; bisphenol AF; bisphenol S; bisphenol M; bisphenol P, etc.], and the like. These phenolic compounds may constitute a novolak resin singly or in combination of two or more thereof.

The novolak resin may be a modified novolak resin. For example, the novolak resin may be a novolak resin having a non-phenolic compound skeleton [e.g., an araliphatic skeleton (e.g., $C_{6-10}$-arene-di-$C_{1-4}$-alkylene skeleton such as a xylylene skeleton), an alicyclic skeleton (e.g., a cross-linked alicyclic hydrocarbon skeleton such as a dicyclopentadiene skeleton), etc.] or may be a halogenated (e.g., brominated) novolak resin.

Examples of typical novolak type epoxy resins include novolak type epoxy resins using a phenolic compound as a polymerization component [e.g., phenol novolak type epoxy resins, alkylphenol novolak type epoxy resins (e.g., cresol novolak type epoxy resins etc.), naphthol novolak type epoxy resins, bisphenol novolak type epoxy resins (e.g., bisphenol A novolak type epoxy resins, bisphenol F novolak type epoxy resin, etc.), etc.], modified novolak type epoxy resins using a phenolic compound as a polymerization component [e.g., modified novolak type epoxy resins using the phenolic compound as a polymerization component, such as aralkyl novolak type epoxy resins (e.g., xylylene skeleton-containing phenol novolak resins etc.), dicyclopentadiene skeleton-containing novolak type epoxy resins (e.g., dicyclopentadiene skeleton-containing phenol novolak type epoxy resins), biphenyl skeleton-containing novolak type epoxy resins (e.g., biphenyl skeleton-containing phenol novolak type epoxy resins), and brominated novolak type epoxy resins (e.g., brominated phenol novolak type epoxy resins)], and the like.

Incidentally, the novolak type epoxy resin may be, for example, an epoxy resin represented by the following formula (1):

[Chem 1]

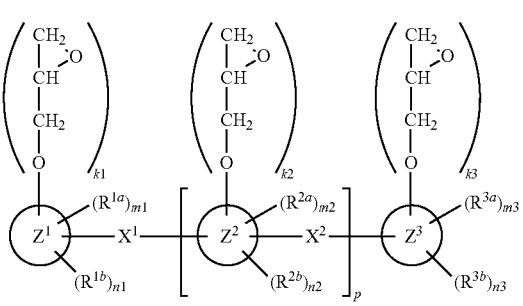

[in the formula, $X^1$ and $X^2$ are the same or different and each represents a methylene group, an arene-dialkylene group, or a group represented by the following formula (a):

[Chem 2]

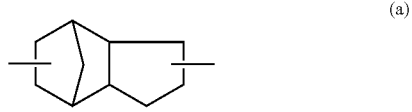

$Z^1$, $Z^2$ and $Z^3$ are the same or different and each represents an aromatic hydrocarbon ring, $R^{1a}$, $R^{2a}$ and $R^{3a}$ are the same or different and each represents a hydrocarbon group, $R^{1b}$, $R^{2b}$ and $R^{3b}$ are the same or different and each represents a halogen atom, k1, k2 and k3 are the same or different and each represents an integer of 1 to 4, m1, m2, m3, n1, n2, and n3 are the same or different and each represents an integer of 0 or more, and p represents an integer of 0 or more.

In $X^1$ to $X^3$ in the above formula (1), examples of the arene-dialkylene group (or an alkylenearylenealkylene group) include a $C_{6-10}$-arylene-di-$C_{1-4}$-alkylene group such as a xylylene group, and the like. Incidentally, $X^1$ and $X^2$ may be the same or different and particularly, may be the same.

Examples of the aromatic hydrocarbon ring represented by $Z^1$ to $Z^3$ in the formula (1) include a benzene ring, a polycyclic aromatic hydrocarbon ring (e.g., a bicyclic to tetracyclic aromatic hydrocarbon ring such as a naphthalene ring), an aromatic hydrocarbon ring in which a plurality of aromatic hydrocarbon rings are linked via a linking group [e.g., a biphenyl ring, a bis(hydroxyphenyl)alkane ring (e.g., a diphenyl-$C_{1-10}$-alkane ring such as 2,2-diphenylpropane ring, a 1,1-diphenylethane ring, or a diphenylmethane ring), a diphenylcycloalkane ring (e.g., a diphenyl-$C_{5-10}$-cycloalkane ring such as 1,1-diphenylcyclohexane ring), a 1,3-di(2-phenyl-2-methylethyl)benzene ring, a 1,4-di(2-phenyl-2-methylethyl)benzene ring, a diphenyl sulfone ring, etc.], and the like. Incidentally, $Z^1$ to $Z^3$ may be the same or different rings and particularly, may be the same.

Examples of the hydrocarbon group represented by $R^{1a}$ to $R^{3a}$ in the formula (1) include alkyl groups (e.g., $C_{1-20}$-alkyl groups, preferably $C_{1-12}$-alkyl groups, more preferably $C_{1-4}$-alkyl groups, such as methyl group, ethyl group, n-propyl group, isopropyl group, n-butyl, s-butyl group, t-butyl group, 1,1,3,3-tetramethylbutyl group, decyl group, and dodecyl group), cycloalkyl groups (e.g., $C_{5-10}$-cycloalkyl groups such as cyclohexyl group), aryl groups (e.g., $C_{6-10}$-aryl groups such as phenyl group), aralkyl groups (e.g., $C_{6-10}$-aryl-$C_{1-10}$-alkyl groups such as 1,1-dimethyl-1-phenylmethyl group, etc.), and the like. Incidentally, $R^{1a}$ to $R^{3a}$ may be the same or different hydrocarbon groups and particularly, may be the same.

Furthermore, examples of the halogen atom represented by $R^{1b}$ to $R^{3b}$ in the formula (1) include fluorine atom, chlorine atom, bromine atom, and iodine atom and particularly, may be bromine atom.

The number of the glycidyloxy groups k1 to k3 is sufficiently 1 to 4 and may be usually 1 to 3, preferably 1 or 2. In particular, when $Z^1$ to $Z^3$ are each a benzene ring, k1 to k3 are each 1 in many cases and, when $Z^1$ to $Z^3$ are each a naphthalene ring, k1 to k3 are each 1 or 2 in many cases.

Moreover, m1 to m3 can be appropriately selected depending on the kind of $Z^1$ to $Z^3$, and may be each, for example, 0 to 3, preferably 0 to 2, and more preferably 0 to 1. In particular, when $Z^1$ to $Z^3$ are each a benzene ring, m1 to m3 are each 0 to 2 (particularly 0 or 1) in many cases. Furthermore, n1 to n3 may be each 0 to 4, preferably 0 to 3, and more preferably 0 to 2.

Incidentally, k1+m1+n1, k2+m2+n2, and k3+m3+n3 may be selected depending on the kind of $Z^1$ to $Z^3$, and may be each, for example, 0 to 4, preferably 0 to 3, and more preferably 0 to 2 when $Z^1$ to $Z^3$ are each a benzene ring.

In the formula (1), the repeating number (average number) p is sufficiently 0 or more and may be, for example, approximately 0 to 10,000, preferably 1 to 5,000, and more preferably 2 to 1,000.

The novolak type epoxy resin may be used singly or in combination of two or more thereof.

Incidentally, the number average molecular weight of the novolak type epoxy resin may be, for example, approximately 1,000 to 1,000,000, preferably 5,000 to 500,000, and more preferably 10,000 to 100,000.

The epoxy equivalent of the polyfunctional epoxy resin may be selected from the range of approximately 600 g/eq or less (e.g., 50 to 500 g/eq), and may be, for example, approximately 400 g/eq or less (e.g., 60 to 350 g/eq), preferably 300 g/eq or less (e.g., 70 to 270 g/eq), more preferably 250 g/eq or less (e.g., 80 to 220 g/eq), and particularly 200 g/eq or less (e.g., 90 to 190 g/eq), and also may be usually approximately 350 g/eq or less, 100 to 330 g/eq, preferably 140 to 320 g/eq, more preferably 150 to 310 g/eq, particularly 160 to 300 g/eq, and especially preferably 170 to 290 g/eq). Incidentally, in the case where the polyfunctional epoxy resin is a glycidyl ether type aromatic epoxy resin such as a novolak type epoxy resin (or in the case where it contains a glycidyl ether type aromatic epoxy resin such as a novolak type epoxy resin), the epoxy equivalent (lower limit of the epoxy equivalent) may be, for example, 80 g/eq or more (e.g., 100 g/eq or more), preferably 120 g/eq or more, more preferably 130 g/eq or more, and particularly 140 g/eq or more (e.g., 140 to 320 g/eq). In the present invention, particularly, by the combination of the metal flake and a polyfunctional epoxy resin having a relatively low epoxy equivalent, a conductive composition having excellent conductivity and close contact is easily obtained efficiently.

The polyfunctional epoxy resin may be used singly or in combination of two or more thereof.

(Other Epoxy Resin)

The epoxy resin component (curable component) is sufficiently at least contains a polyfunctional epoxy resin and may contain another epoxy resin within the range where the effects of the present invention are not impaired. The other epoxy resin is not particularly limited and examples thereof include monofunctional epoxy resins [e.g., glycidyl ethers (e.g., aromatic monoglycidyl ethers such as phenylglycidyl ether and o-phenylphenylglycidyl ether), cycloalkene oxides (e.g., 4-vinylepoxycyclohexane and epoxyhexahydrophthalic acid dialkyl esters, etc.), etc.], bifunctional epoxy resins {e.g., bifunctional aliphatic epoxy resins [e.g., aliphatic diglycidyl ethers (e.g., alkanediol diglycidyl ethers such as butanediol diglycidyl ether and neopentylglycol diglycidyl ether; poly-$C_{2-4}$-alkanediol diglycidyl ethers such as polyethylene glycol diglycidyl ether and polypropylene glycol diglycidyl ether), diglycidyl ether type bifunctional aliphatic epoxy resins such as cyclohexanedimethanol diglycidyl ether; glycidyl ester type bifunctional aliphatic epoxy resins such as diglycidyl esters of a hydrogenation product of an aromatic dicarboxylic acid (e.g., tetrahydrophthalic acid, hexahydrophthalic acid, etc.) and dimer acid glycidyl esters], bifunctional alicyclic epoxy resins (e.g., 3,4-epoxycyclohexylmethyl-3,4-epoxycyclohexanecarboxylate etc.), bifunctional aromatic epoxy resins [e.g., diglycidyl arenes (e.g., diglycidyloxynaphthalene (such as compounds exemplified above), etc.), glycidyl ether type bifunctional aromatic epoxy resins such as bisphenol type epoxy resins (e.g., diglycidyl ethers of the bisphenols and alkylene oxide adducts thereof, which are exemplified in the section of the above novolak resins, such as bisphenol A type epoxy resins); glycidyl ester type bifunctional aromatic epoxy resins such as aromatic dicarboxylic acid (such as phthalic acid) diglycidyl esters; glycidyl amine type bifunctional aromatic epoxy resins such as N,N-diglycidyl aniline, etc.} and the like.

The other epoxy resin (monofunctional epoxy resin and/or bifunctional epoxy resin) may be used singly or in combination of two or more thereof.

The epoxy equivalent of the other epoxy resin may be, for example, approximately 800 g/eq or less (e.g., 50 to 750 g/eq), preferably 90 to 700 g/eq, more preferably 130 to 600 g/eq, and particularly 150 to 500 g/eq.

Incidentally, in the case where the polyfunctional epoxy resin is combined with the other epoxy resin, the epoxy equivalent of the total of them may be adjusted so as to fall within the same range (e.g., 400 g/eq or less) as the epoxy equivalent of the above polyfunctional epoxy resin.

In the case where the other epoxy resin is used, the ratio of the polyfunctional epoxy resin to the other epoxy resin can be selected from the range of the former/the latter (weight ratio)=approximately 99.9/0.1 to 15/85 (e.g., 99.5/0.5 to 20/80) and may be, for example, approximately 99/1 to 25/75 (e.g., 97/3 to 30/70), preferably 95/5 to 35/65 (e.g., 93/7 to 40/60), and more preferably 90/10 to 45/55.

(Curing Agent, Curing Accelerator)

The epoxy resin component may usually contain a curing agent (epoxy resin curing agent), in addition to the polyfunctional epoxy resin (and the other epoxy resin as needed) as a main component.

The curing agent is not particularly limited and examples thereof include amine-based curing agents {e.g., aliphatic amine-based curing agents (e.g., (poly)alkylenepolyamines such as ethylenediamine, hexamethylenediamine, diethylenetriamine, triethylenetetramine, tetraethylenepentamine, and diethylaminopropylamine, etc.), alicyclic amine-based curing agents (e.g., monocyclic aliphatic polyamines such as menthenediamine, isophoronediamine, bis(4-amino-3-methylcyclohexyl)methane, and 3,9-bis(3-aminopropyl)-2,4,8,10-tetraoxaspiro[5.5]undecane; cross-linked cyclic polyamines such as norbornanediamine; etc), aromatic amine-based curing agents [e.g., polyaminoarenes (e.g., diaminoarenes, preferably diamino-$C_{6-10}$-arenes, such as para-phenylenediamine and meta-phenylenediamine), polyamino-alkylarenes (e.g., diamino-alkylarenes, preferably diamino-mono- to tri-$C_{1-4}$-alkyl-$C_{6-10}$-arenes, such as diethyltoluenediamine), poly(aminoalkyl)arenes (e.g., di(aminoalkyl)arenes, preferably di(amino-$C_{1-4}$-alkyl)-$C_{6-10}$-arenes, such as xylylenediamine), poly(aminoaryl)alkanes (e.g., di(aminoaryl)alkanes, preferably di(amino-$C_{6-10}$-aryl)-$C_{1-6}$-alkanes, such as diaminodiphenylmethane), poly(amino-alkylaryl)alkanes (e.g., di(amino-alkylaryl)alkanes, preferably di(amino-$C_{2-4}$-alkyl-$C_{6-10}$-aryl)-$C_{1-6}$-alkanes, such as 4,4'-methylenebis(2-ethyl-6-methylaniline)), bis(aminoarylalkyl)arenes (e.g., bis(amino-$C_{6-10}$-aryl-$C_{1-10}$-alkyl)-$C_{6-10}$-arenes such as 1,3-bis[2-(4-aminophenyl)-2-propyl)]benzene and 1,4-bis[2-(4-aminophenyl)-2-propyl)] benzene, etc.), di(aminoaryl) ethers (e.g., di(amino-$C_{6-12}$-aryl) ethers, preferably di(amino-$C_{6-10}$-aryl) ethers, such as diaminodiphenyl ether, etc.), di(aminoaryloxy)arenes (e.g., di(amino-$C_{6-12}$-aryloxy)-$C_{6-12}$-arenes, preferably di(amino-$C_{6-10}$-aryloxy)-$C_{6-10}$-arenes, such as 1,3-bis(3-aminophenoxy)benzene), di(aminoaryl) sulfones (e.g., di(amino-$C_{6-12}$-aryl) sulfones, preferably di(amino-$C_{6-10}$-aryl) sulfones, such as diaminodiphenyl sulfone, etc.), etc.], imidazole-based curing agents [imidazoles (e.g., alkylimidazoles such as 2-methylimidazole, 2-phenylimidazole, 2-heptadecylimidazole, and 2-ethyl-4-methylimidazole; arylimidazoles such as 2-phenylimidazole, 2-phenyl-4-methylimidazole, 2-phenyl-4-methyl-5-hydroxymethylimidazole, and 1-benzyl-2-phenylimidazole), salts of imidazoles (e.g., organic salts such as formate salts, phenol salts, and phenol novolak salts; salts such as carbonate salts), reaction products (or adducts) of epoxy compounds (e.g., polyepoxy compounds such as diglycidyl ether of bisphenol A) with imidazoles, etc.], etc.}, phenol resin-based curing agents (e.g., novolak resins exemplified in the section of the novolak type epoxy resins, such as phenol novolak resin and cresol novolak resin, etc.), acid anhydride-based curing agents (e.g., aliphatic carboxylic acid anhydrides such as dodecenylsuccinic anhydride and adipic anhydride; alicyclic carboxylic acid anhydrides such as tetrahydrophthalic anhydride, methyltetrahydrophthalic anhydride, hexahydrophthalic anhydride, methylhexahydrophthalic anhydride, methylhimic anhydride, and methylcyclohexenedicarboxylic acid anhydride; aromatic carboxylic acid anhydrides such as phthalic anhydride, trimellitic anhydride, pyromellitic anhydride, and benzophenonetetracarboxylic acid anhydride), polyaminoamide-based curing agents, polymercaptan-based curing agents, latent curing agents (boron trifluoride-amine complexes, dicyandiamide, carboxylic acid hydrazide, etc.), and the like. These curing agents may be used singly or in combination of two or more thereof. Incidentally, the curing agent may also act as a curing accelerator to be mentioned below in some cases.

Of these, amine-based curing agents are preferred, and particularly, aromatic amine-based curing agents may be suitably used. In the combination of the metal flake with the polyfunctional epoxy resin, when the aromatic amine-based curing agent is used, it is possible to efficiently improve conductivity probably because of large volume shrinkage. Moreover, the aromatic amine-based curing agent is suitable also from the viewpoint of heat resistance.

The ratio of the curing agent depends on the type of the curing agent and also the combination of the epoxy resin with the curing agent but may be, for example, relative to 100 parts by weight of the epoxy resin, approximately 0.1 to 500 parts by weight, preferably 1 to 300 parts by weight, and more preferably 2 to 200 parts by weight (e.g., 3 to 100 parts by weight) and may be usually approximately 4 to 80 parts by weight (e.g., 5 to 60 parts by weight).

Depending on the type of the curing agent, the ratio of the curing agent can be appropriately selected according to the epoxy equivalent of the epoxy resin (the polyfunctional epoxy resin, the total of the polyfunctional epoxy resin and the other epoxy resin). For example, relative to 1 equivalent of the epoxy group of the epoxy resin, the ratio may be, for example, such that the functional group (the amino group etc.) of the curing agent becomes, for example, 0.1 to 4.0 equivalents, preferably 0.3 to 2.0 equivalents, and more preferably 0.5 to 1.5 equivalents.

Moreover, the epoxy resin component may further contain a curing accelerator. The curing accelerator is not particularly limited and there may be mentioned conventional curing accelerators for epoxy resins, and examples thereof include phosphines (e.g., ethylphosphine, propylphosphine, phenylphosphine, triphenylphosphine, trialkylphosphine, etc.), amines [e.g., secondary to tertiary amines such as piperidine, triethylamine, benzyldimethylamine, triethanolamine, dimethylaminoethanol, triethylenediamine, tris (dimethylaminomethyl)phenol, and N,N-dimethylpiperazine, or salts thereof, etc.]. Furthermore, depending on the combination, the curing agents exemplified above (e.g., imidazoles etc.) can be also used as a curing accelerator. The curing accelerator may be used singly or in combination of two or more thereof.

The ratio of the curing accelerator is not particularly limited and may be, although it depends on the combination with the epoxy resin and the curing agent, for example, relative to 100 parts by weight of the epoxy resin, approximately 0.01 to 100 parts by weight, preferably 0.05 to 80 parts by weight and more preferably 0.1 to 50 parts by weight, and may be usually approximately 0.5 to 30 parts by weight (e.g., 1 to 25 parts by weight).

The ratio of the conductive metal powder to the epoxy resin component (usually the sum of at least the epoxy resin and the curing agent) can be selected from the range of, for example, the former/the latter (weight ratio)=approximately 99.1/0.9 to 20/80 (e.g., 99.7/0.3 to 30/70) and may be, for example, approximately 99.5/0.5 to 40/60 (e.g., 99.3/0.7 to 45/55), preferably 99/1 to 50/50 (e.g., 98.5/1.5 to 55/45), more preferably 98/2 to 55/45 (e.g., 97.5/2.5 to 60/40), and particularly 97/3 to 60/40 (e.g., 96.5/3.5 to 65/35), and may be usually 99/1 to 70/30 (e.g., 98/2 to 75/25, preferably 97/3 to 80/20, and more preferably 96/4 to 85/15). In the present invention, by combining the metal flake with the specific epoxy resin component, it is possible to efficiently obtain a conductive composition having excellent conductivity and close contact even when the ratio of the resin component is reduced.

The ratio of the metal flake to the polyfunctional epoxy resin can be selected from the range of, for example, the former/the latter (weight ratio)=approximately 99.9/0.1 to 25/75 (e.g., 99.8/0.2 to 30/70) and may be, for example, approximately 99.7/0.3 to 40/60 (e.g., 99.5/0.5 to 45/55), preferably 99.3/0.7 to 50/50 (e.g., 99/1 to 55/45), more preferably 98.5/1.5 to 55/45 (e.g., 98/2 to 55/45), and particularly 97.5/2.5 to 60/40 (e.g., 97/3 to 65/35), and may be usually 99/1 to 70/30 (e.g., 98/2 to 75/25, preferably 97/3 to 80/20, and more preferably 96/4 to 85/15).

(Other Components)

The conductive composition of the present invention may further contain a solvent (or a dispersion medium). Such a composition containing a solvent (particularly, a paste-like composition) is suitable as a coating composition (conductive composition for coating). The solvent is not particularly limited and examples thereof include water, alcohols {e.g., aliphatic alcohols [e.g., saturated or unsaturated $C_{1-30}$ aliphatic alcohols, preferably saturated or unsaturated $C_{8-24}$ aliphatic alcohols, such as methanol, ethanol, propanol, isopropanol, butanol, hexanol, heptanol, octanol (1-octanol, 2-octanol, etc.), decanol, lauryl alcohol, tetradecyl alcohol, cetyl alcohol, 2-ethyl-1-hexanol, octadecyl alcohol, hexadecenol, and oleyl alcohol, etc.], alicyclic alcohols [e.g., cycloalkanols such as cyclohexanol; terpene alcohols (e.g., monoterpene alcohol, etc.) such as terpineol and dihydroterpineol; etc.], araliphatic alcohols (e.g., benzyl alcohol, phenethyl alcohol, etc.), polyhydric alcohols (glycols such as (poly)$C_{2-4}$-alkylene glycols such as ethylene glycol, propylene glycol, diethylene glycol, dipropylene glycol, and polyethylene glycol; polyhydric alcohols having three or more hydroxyl groups, such as glycerin, etc.), etc.}, glycol ethers (e.g., (poly)alkylene glycol monoalkyl ethers such as ethylene glycol monomethyl ether (methyl cellosolve), ethylene glycol monoethyl ether (ethyl cellosolve), ethylene glycol monobutyl ether (butyl cellosolve), diethylene glycol monomethyl ether (methyl carbitol), diethylene glycol monoethyl ether (ethyl carbitol), diethylene glycol monobutyl ether (butyl carbitol), triethylene glycol monobutyl ether, propylene glycol monomethyl ether, dipropylene glycol monomethyl ether, and tripropylene glycol butyl ether; (poly)alkylene glycol monoaryl ethers such as 2-phenoxyethanol; etc.), glycol esters (e.g., (poly)alkylene glycol acetates such as carbitol acetate, etc.), glycol ether esters (e.g., (poly)alkylene glycol monoalkyl ether acetates such as ethylene glycol monoethyl ether acetate, ethylene glycol monomethyl ether acetate, and diethylene glycol monobutyl ether acetate), hydrocarbons [e.g., aliphatic hydrocarbons (e.g., saturated or unsaturated aliphatic hydrocarbons such as hexane, trimethylpentane, octane, decane, dodecane, tetradecane, octadecane, heptamethylnonane, and tetramethylpentadecane), alicyclic hydrocarbons (cyclohexane etc.), halogenated hydrocarbons (methylene chloride, chloroform, dichloroethane, etc.), aromatic hydrocarbons (e.g., toluene, xylene, etc.), etc.], esters (e.g., methyl acetate, ethyl acetate, benzyl acetate, isoborneol acetate, methyl benzoate, ethyl benzoate, etc.), amides (mono- or di-$C_{1-4}$-acylamides such as formamide, acetamide, N-methylformamide, N-methylacetamide, N,N-dimethylformamide, and N,N-dimethylacetamide, etc.), ketones (acetone, methyl ethyl ketone, methyl isobutyl ketone, etc.), ethers (diethyl ether, dipropyl ether, dioxane, tetrahydrofuran, etc.), organic carboxylic acids (acetic acid etc.), and the like. These solvents may be used singly or in combination of two or more thereof.

Of these solvents, widely use can be made of aliphatic alcohols (e.g., alkanols such as ethyl alcohol, propyl alcohol, isopropyl alcohol, butyl alcohol, 2-ethyl-1-hexanol, octanol, and decanol; (poly)alkanediols such as ethylene glycol, diethylene glycol, propylene glycol, dipropylene glycol, and 1,4-butanediol; glycerin, etc.), alicyclic alcohols (e.g., cycloalkanols such as cyclohexanol; terpene alcohols such as terpineol and dihydroterpineol, etc.), glycol ethers [e.g., cellosolves ($C_{1-4}$-alkyl cellosolves such as methyl cellosolve, ethyl cellosolve, and butyl cellosolve) carbitols ($C_{1-4}$-alkyl carbitols such as methyl carbitol, ethyl carbitol, propyl carbitol, and butyl carbitol, etc.), etc.], glycol ether esters [e.g., cellosolve acetates ($C_{1-4}$-alkyl cellosolve acetates such as ethyl cellosolve acetate), carbitol acetates (e.g., $C_{1-4}$-alkyl carbitol acetates such as butyl carbitol acetate, etc.), etc.], and the like. Such solvents are suitable because appropriate viscosity is imparted to the conductive composition (or the conductive paste) and also it is easy to homogeneously mix the metal flake and the epoxy resin component.

Furthermore, the conductive composition of the present invention may contain, depending on the application, conventional additives, for example, colorants (dyes, pigments, etc.), hue-improving agents, dye-fixing agents, gloss-imparting agents, metal corrosion inhibitors, stabilizers (antioxidants, ultraviolet absorbers, etc.), surfactants or dispersing agents (anionic surfactants, cationic surfactants, nonionic surfactants, amphoteric surfactants, etc.), dispersion stabilizers, thickeners or viscosity modifiers, humectants, thixotropy-imparting agents, leveling agents, defoamers, fungicides, fillers, and reactive diluents within the range where the effects of the present invention are not impaired. These additives can be used singly or in combination of two or more thereof.

Incidentally, as described above, the conductive composition of the present invention may be a conductive composition containing a solvent. In such a conductive composition (or conductive paste) containing a solvent, the concentration of solid matter may be selected from the range of approximately 10% by weight or more (e.g., 20 to 99% by weight), although it depends on the use application, and may be, for example, 20% by weight or more (e.g., 30 to 98% by weight), preferably 40% by weight or more (e.g., 50 to 97% by weight), more preferably 60% by weight or more (e.g., 70 to 95% by weight), and usually 50 to 90% by weight (e.g., 60 to 80% by weight).

The viscosity of the conductive composition (particularly, the conductive composition containing a solvent) of the present invention is not particularly limited and can be appropriately selected according to the use application but may be, for example, at 25° C., approximately 1 to 300 Pa·s (e.g., 3 to 200 Pa·s), preferably 5 to 150 Pa·s (e.g., 7 to 100 Pa·s), and more preferably 10 to 50 Pa·s. When the viscosity is too small, there is a concern of dripping at the time of application (e.g., dispensing application), and when the viscosity is too large, there is a concern that stringing occurs. The viscosity is, for example, measured under the following conditions.

Measurement equipment: rheometer
Measurement conditions: shear strength 5 (1/s), diameter 4 cm, 2° cone Incidentally, the conductive composition of the present invention can be obtained by mixing individual components without particular limitation, but typically, it may be obtained by dispersing a conductive metal powder and an epoxy resin component (and other component(s), as needed) in a solvent (or a dispersing medium).

[Use Applications of Conductive Composition and Molded Body]

The conductive composition (or conductive paste) of the present invention is useful for forming various molded bodies (conductive molded bodies) that require to have conductivity (or a conductive region). For example, since the conductive composition of the present invention has conductivity, it can be utilized as a composition for forming wiring and circuits (or electrodes) on a base material. In particular, since the conductive composition of the present invention can realize high conductivity and thermal conductivity and also is excellent in close contact or adhesiveness to a base material, it is suitable as a conductive adhesive.

That is, the conductive molded body of the present invention has at least a conductive region (or a conductive film) formed of the conductive composition of the present invention. More specifically, in wiring or circuit applications, the conductive molded body can be utilized such a manner that the conductive region formed of the conductive composition on a base material can be utilized as wiring or circuits (or electrodes). Furthermore, in the conductive adhesive applications, the conductive molded body comprises a conjugated base material composed of two base materials and a conductive adhesive that intervenes between the base materials and bonds the two base material (direct bonding), and the conductive adhesive is formed of the conductive composition of the present invention.

Such a molded body can be obtained by applying (or coating) the conductive composition on a base material and subjecting it to a curing treatment. Usually, the conductive composition is directly applied on the base material without forming another adhesive layer.

The base material (or substrate) is not particularly limited and may be appropriately selected depending on the use application. A material constituting the base material may be an inorganic material (inorganic raw material) or may be an organic material (organic raw material).

Examples of the inorganic material include glasses (e.g., soda glass, borosilicate glass, crown glass, barium-containing glass, strontium-containing glass, boron-containing glass, low alkali glass, alkali-free glass, transparent crystallized glass, silica glass, quartz glass, heat-resistant glass, etc.), ceramics {metal oxides (silicon oxide, quartz, alumina or aluminum oxide, zirconia, sapphire, ferrite, titania or titanium oxide, zinc oxide, niobium oxide, mullite, beryllia, etc.), metal nitrides (aluminum nitride, silicon nitride, boron nitride, carbon nitride, titanium nitride, etc.), metal carbides (silicon carbide, boron carbide, titanium carbide, tungsten carbide, etc.), metal borides (titanium boride, zirconium boride, etc.), metal complex oxides [titanate metal salts (barium titanate, strontium titanate, lead titanate, niobium titanium, calcium titanium, magnesium titanate, etc.), zirconate metal salts (barium zirconate, calcium zirconate, lead zirconate, etc.), etc.], etc.}, metals (aluminum, copper, gold, silver, etc.), semiconductors (semiconductors formed of conductors, semiconductors, insulators, and the like, etc.).

Examples of the organic material include polymethyl methacrylate-based resins, styrene-based resins, vinyl chloride-based resins, polyester-based resins [including polyalkylene arylate-based resins (homo- or co-polyalkylene arylates such as polyethylene terephthalate, polybutylene terephthalate, and polyethylene naphthalate, etc.), polyarylate resins, and liquid crystal polymers], polyamide-based resins, polycarbonate-based resins, polysulfone-based resins, polyethersulfone-based resins, polyimide-based resins, cellulose derivatives, fluorocarbon resins, and the like.

Of these materials, preferred are materials having high heat resistance, for example, inorganic materials such as semiconductors, glass and metals, and plastics such as engineering plastics [e.g., aromatic polyester-based resins (polyalkylene arylate-based resins such as polyethylene naphthalate, polyarylate-based resins, etc.), polyimide-based resin, polysulfone-based resin, etc.], liquid crystal polymers, and fluorocarbon resin.

Incidentally, in the conductive adhesive applications, the two base materials may be the same or different base materials. Specific examples of the combination of the base materials can be appropriately selected depending on the use application, and there may be mentioned a combination of a base material formed of a metal and a base material formed of a metal, a combination of a base material formed of a metal and a base material formed of a semiconductor, and the like. In the case of being used as an adhesive between metals, as long as bonding can be performed between the metals, the metal may be formed on a non-metallic base material (e.g., a semiconductor, a plastic, etc.). As more specific examples, for example, in the semiconductor field, there may be mentioned a combination in which one base material is a lead frame [e.g., a lead frame formed of a metal (copper, a copper alloy, etc.)] and another base material is a semiconductor substrate (or a semiconductor chip) [e.g., a semiconductor base material (a silicon substrate, etc.), a semiconductor chip in which a metal film (titanium, platinum, gold, etc.) is formed on a semiconductor base material (a silicon substrate, etc.), etc.], and the like.

The surface of the base material may be subjected to a surface treatment such as an oxidation treatment [a surface oxidation treatment, e.g., a discharge treatment (a corona discharge treatment, a glow discharge, etc.), an acid treatment (a chromic acid treatment, etc.), an ultraviolet irradiation treatment, a flame treatment, etc.], and a surface roughening treatment (a solvent treatment, a sand blasting treatment, etc.), and the like.

The thickness of the base material may be appropriately selected depending on the use application, and may be, for example, approximately 0.001 to 10 mm, preferably 0.01 to 5 mm, and more preferably 0.05 to 3 mm.

Examples of the coating method of the conductive composition to the base material include, for example, a flow coating method, a spin coating method, a spray coating method, a screen printing method, a flexographic printing method, a casting method, a bar coating method, a curtain coating method, a roll coating method, a gravure coating method, a dipping method, a slit method, a photolithography method, an inkjet method, and the like. The conductive composition can be formed, depending on the use application, in part or all over the entire surface of the base material. For example, in the case of forming wiring or a circuit, the coating film of the conductive composition may be formed in a pattern shape and, in the case of the use as a conductive adhesive, a coating film of the conductive composition may be formed corresponding to the shape of the region to be bonded between the two base materials.

In the case of forming the coating film in a pattern shape, for example, coating may be performed by utilizing a screen printing method, an inkjet printing method, an intaglio printing method (e.g., a gravure printing method, etc.), an offset printing method, an intaglio offset printing method, a flexographic printing method, or the like.

After coating, it may be air-dried or it may be dried by heating. The heating temperature can be selected depending on the type of a solvent and is, for example, approximately 50 to 200° C., preferably 80 to 180° C., and more preferably 100 to 150° C. (particularly, 110 to 140° C.). The heating time is, for example, approximately 1 minute to 3 hours, preferably 5 minutes to 2 hours, and more preferably 10 minutes to 1 hour.

In the film (coating film) after coating, the conductive composition (or the epoxy resin) is in an uncured (precursor) state and is usually subjected to a curing treatment. Usually, the curing treatment can be carried out, at least, by heating (or firing or a heat treatment).

In the curing treatment or the heat treatment, the heating temperature (heat treatment temperature) may be, for example, approximately 100 to 350° C., preferably 120 to 320° C. and more preferably 150 to 300° C. (e.g., 180 to 250° C.). The heating time may be, depending on the heating temperature or the like, for example, approximately 10 minutes to 5 hours, preferably 15 minutes to 3 hours, and more preferably 20 minutes to 1 hour.

The thickness of the resulting conductive region or conductive film (coating film after the curing treatment, sintered pattern) can be appropriately selected from the range of approximately 0.01 to 10,000 μm depending on the use application, and may be, for example, approximately 0.1 to 100 μm, preferably 0.1 to 50 μm, more preferably 0.3 to 30 μm (particularly, 0.5 to 10 μm). In the present invention, a metal film of a relatively thick film, for example, having a thickness of approximately 0.3 μm or more (e.g., 0.3 to 100 μm), preferably 0.5 μm or more (e.g., 0.5 to 50 μm), more preferably 1 μm or more (e.g., 1 to 30 μm) may be formed. Even in the case of such a thick film, a metal film having high conductivity can be formed without impairing the close contact to the base material.

EXAMPLES

The following will describe the present invention in more detail with reference to Examples, but the present invention is not limited by these Examples. Various components used in Examples and Comparative Examples are as follows.

(Polyfunctional Epoxy Resin Component A)

A polyfunctional epoxy resin component A was prepared by mixing 100 parts by weight of a phenol novolak type epoxy resin (manufactured by Mitsubishi Chemical Corporation, "jER152", epoxy equivalent: 174 g/eq) with 27.3 parts by weight of an aromatic polyamine (manufactured by Mitsubishi Chemical Corporation, "jER Cure W", diethyltoluenediamine) and 1.9 parts by weight of triphenylphosphine.

(Polyfunctional Epoxy Resin Component B)

A polyfunctional epoxy resin component B was prepared by mixing 100 parts by weight of a phenol novolak type epoxy resin (manufactured by Mitsubishi Chemical Corporation, "jER152", epoxy equivalent: 174 g/eq) with 40.5 parts by weight of an aromatic polyamine (manufactured by Tokyo Kasei Kogyo Co., Ltd., 4,4'-methylenebis(2-ethyl-6-methylaniline) and 2.1 parts by weight of triphenylphosphine.

(Polyfunctional Epoxy Resin Component C)

A polyfunctional epoxy resin component C was prepared by mixing 100 parts by weight of a phenol novolak type epoxy resin (manufactured by Mitsubishi Chemical Corporation, "jER152", epoxy equivalent: 174 g/eq) with 27.3 parts by weight of an aromatic polyamine (manufactured by Mitsubishi Chemical Corporation, "jER Cure W", diethyltoluenediamine).

(Polyfunctional Epoxy Resin Component D)

A polyfunctional epoxy resin component D was prepared by mixing 100 parts by weight of a naphthalene type epoxy resin (manufactured by DIC Corporation, "HP4710", epoxy equivalent: 180 g/eq, tetrafunctional type (the number of epoxy groups: 4), 1,1'-methylenebis(2,7-diglycidyloxynaphthalene)) with 27.6 parts by weight of an aromatic polyamine (manufactured by Mitsubishi Chemical Corporation, "jER Cure W", diethyltoluenediamine) and 1.9 parts by weight of triphenylphosphine.

(Polyfunctional Epoxy Resin Component E)

A polyfunctional epoxy (polyfunctional/bifunctional composite type) resin component E was prepared by mixing 50 parts by weight of a phenol novolak type epoxy resin (manufactured by Mitsubishi Chemical Corporation, "jER152", epoxy equivalent: 174 g/eq) with 50 parts by weight of a diglycidyl ester of dimer acid (manufactured by Mitsubishi Chemical Corporation, "jER871", epoxy equivalent: 420 g/eq) and 19.3 parts by weight of an aromatic polyamine (manufactured by Mitsubishi Chemical Corporation, "jER Cure W", diethyltoluenediamine).

(Polyfunctional Epoxy Resin Component F)

A polyfunctional epoxy resin component F was prepared by mixing 100 parts by weight of a glycidyl amine type aromatic epoxy resin (N,N-bis(2,3-epoxypropyl)-4-(2,3-epoxypropoxy)aniline, Manufactured by Mitsubishi Chemical Corporation, "jER630", epoxy equivalent: 96 g/eq) with 49.0 parts by weight of an aromatic polyamine (manufactured by Mitsubishi Chemical Corporation, "jER Cure W", diethyltoluenediamine).

(Polyfunctional Epoxy Resin Component G)

A polyfunctional epoxy resin component G was prepared by mixing 100 parts by weight of a phenol novolak type epoxy resin (manufactured by Mitsubishi Chemical Corporation, "jER152", epoxy equivalent: 174 g/eq) with 14 parts by weight of an aliphatic polyamine (triethylenetetramine, manufactured by Wako Pure Chemical Industries, Ltd.) and 114 parts by weight of butyl carbitol as a solvent.

(Polyfunctional Epoxy Resin Component H)

A polyfunctional epoxy resin component H was prepared by mixing 100 parts by weight of a phenol novolak type epoxy resin (manufactured by Mitsubishi Chemical Corporation, "jER152", epoxy equivalent: 174 g/eq) with 5 parts by weight of an imidazole (2-ethyl-4-methylimidazole, manufactured by Wako Pure Chemical Industries, Ltd.) and 105 parts by weight of butyl carbitol as a solvent.

(Polyfunctional Epoxy Resin Component I)

A polyfunctional epoxy resin component I was prepared by mixing 100 parts by weight of a phenol novolak type epoxy resin (manufactured by Mitsubishi Chemical Corporation, "jER152", epoxy equivalent: 174 g/eq) with 20 parts by weight of an imidazole (an imidazole-based epoxy adduct curing agent, manufactured by Ajinomoto Fine Techno Co., PN-23) and 120 parts by weight of butyl carbitol as a solvent.

(Polyfunctional Epoxy Resin Component J)

A polyfunctional epoxy resin component J was prepared by mixing 100 parts by weight of a glycidyl amine type aromatic epoxy resin (N,N-bis(oxiranylmethyl)-4-(oxiranylmethoxy)aniline (N,N,N',N'-tetraglycidyl-4,4'-diaminodiphenylmethane), manufactured by Mitsubishi Chemical Corporation, "jER604", epoxy equivalent: 130 g/eq) with 36.5 parts by weight of an aromatic polyamine (manufactured by Mitsubishi Chemical Corporation, "jER Cure W", diethyltoluenediamine).

(Polyfunctional Epoxy Resin Component K)

A polyfunctional epoxy resin component K was prepared by mixing 100 parts by weight of a bisphenol A novolak type epoxy resin (manufactured by Mitsubishi Chemical Corporation, "jER157S70", epoxy equivalent: 220 g/eq) with 21.6 parts by weight of an aromatic polyamine (manufactured by Mitsubishi Chemical Corporation, "jER Cure W", diethyltoluenediamine).

(Polyfunctional Epoxy Resin Component L)

A polyfunctional epoxy resin component L was prepared by mixing 100 parts by weight of a dicyclopentadiene skeleton-containing novolak type epoxy resin (manufactured by DIC Corporation, "HP7200", epoxy equivalent: 261 g/eq) with 18.2 parts by weight of an aromatic polyamine (manufactured by Mitsubishi Chemical Corporation, "jER Cure W", diethyltoluenediamine).

(Polyfunctional Epoxy Resin Component M)

A polyfunctional epoxy resin component M was prepared by mixing 100 parts by weight of a dicyclopentadiene skeleton-containing novolak type epoxy resin (manufactured by DIC Corporation, "HP7200HHH", epoxy equivalent: 286 g/eq) with 16.6 parts by weight of an aromatic polyamine (manufactured by Mitsubishi Chemical Corporation, "jER Cure W", diethyltoluenediamine).

(Bifunctional Epoxy Resin Component)

A bifunctional epoxy resin component was prepared by mixing 100 parts by weight of a bisphenol A propoxy diglycidyl ether (manufactured by Wako Pure Chemical Industries, Ltd., epoxy equivalent: 228 g/eq) with 20.8 parts of an aromatic polyamine (manufactured by Mitsubishi Chemical Corporation, "jER Cure W", diethyltoluenediamine).

(Polyester Resin)

A polyester resin solution (manufactured by Arakawa Chemical Industries, Ltd., "Arakyd 7005", resin concentration: 34.6% by weight) was used.

(Silver Flakes 1 to 5)

Using, as a raw material, an aggregated powder obtained by heating silver nanoparticles (median particle diameter of primary particles: approximately 100 nm), which was prepared in accordance with Examples 1 and 2 of JP-A-2010-229544, at 100° C. for 3 hours to aggregate the silver nanoparticles, a silver flake was prepared by flattening the aggregated powder by a ball mill. The preparation was performed five times (5 lots at 1 lot/day) and the silver flakes prepared at individual lots were taken as silver flakes 1 to 5 and 8.

Characteristics of the silver flakes 1 to 5 and 8 are as follows.

Silver flake 1: average particle diameter (D50) 1.6 μm, BET specific surface area 2.5 $m^2/g$, tap density 2.6 $g/cm^3$ Silver flake 2: average particle diameter (D50) 1.2 μm, BET specific surface area 2.7 $m^2/g$, tap density 2.5 $g/cm^3$ Silver flake 3: average particle diameter (D50) 4.3 μm, BET specific surface area 1.5 $m^2/g$, tap density 2.1 $g/cm^3$ Silver flake 4: average particle diameter (D50) 5.1 μm, BET specific surface area 1.5 $m^2/g$, tap density 1.6 $g/cm^3$ Silver flake 5: average particle diameter (D50) 1.5 μm, BET specific surface area 1.8 $m^2/g$, tap density 2.3 $g/cm^3$ Silver flake 8: average particle diameter (D50) 1.2 μm, BET specific surface area 3.8 $m^2/g$, tap density 2.6 $g/cm^3$ (Silver Flake 6)

Nanomelt Ag-XF301S manufactured by Fukuda Metal Foil & Powder Co., Ltd. was used as silver flake 6.

The silver flake 6 has an average particle diameter (D50) of 4.0 μm, a BET specific surface area of 2.7 $m^2/g$, and a tap density of 0.8 $g/cm^3$.

(Silver Flake 7)

Nanomelt Ag-XF301K manufactured by Fukuda Metal Foil & Powder Co., Ltd. was used as silver flake 7.

The silver flake 7 has an average particle diameter (D50) of 6.0 μm, a BET specific surface area of 1.9 $m^2/g$, and a tap density of 0.6 $g/cm^3$.

Incidentally, the following will show measurement methods or evaluation methods of various physical properties and characteristics.

(Average Particle Diameter)

The average particle diameter (D50) of the metal flakes is a volume-based median particle diameter measured by using a laser diffraction scattering particle size distribution measuring device (manufactured by Nikkiso Co., Ltd., "Micro Track").

(BET Specific Surface Area)

After 3 g of a sample was deaerated at 70° C. for 10 minutes, BET specific surface area was determined by a BET single point method by using a specific surface area measuring device (manufactured by Quantachrome Corporation, "Monosorb").

(Tap Density)

Tap density (15 g/sample volume (cm³) after tapping) was determined from the sample volume by using a tap density measuring device (manufactured by Shibayama Kagaku Co., Ltd., "SS-DA-2"), after 15 g of a sample was placed in a 20 mL test tube and the tube was allowed to fall 1,000 times with a fall height of 20 mm.

(Resistivity)

A conductive composition was applied to a slide glass by using an applicator and, after dried at 120° C. for 30 minutes, was fired at 200° C. for 90 minutes to form a conductive film having a thickness of 5 μm, and then resistivity was calculated from surface resistance measured by four-point probe method and film thickness measured by a stylus type film thickness meter.

(Bond Strength)

By using a conductive composition, a silicon chip of 3.5 mm×3.5 mm was attached to a copper plate having a thickness of 2 mm and, after drying at 120° C. for 30 minutes, firing was performed at 200° C. for 90 minutes to bond the silicon chip [a silicon chip having films formed by sputtering titanium, platinum, and gold in this order on silicon (bonding surface being gold)] to the copper plate. Thereafter, evaluation was performed by measuring shear strength.

(Thermal Conductivity)

By using a resistivity value measured, thermal conductivity (calculated value) was calculated by using an equation according to the Wiedemann-Franz law: $\lambda = L \times T / \rho v$ ($\lambda$ is thermal conductivity, L is Lorentz number ($2.44 \times 10^{-8}$ $W \cdot \Omega \cdot K^{-2}$), T is absolute temperature (298K), and $\rho v$ is resistivity).

As for Examples 2, 7, 10, and 11, the thermal conductivity (measured value) was measured by laser flash by using a cylindrical sample having a thickness of 2 mm and a diameter of 10 mm prepared by further drying the conductive composition at 120° C. for 30 minutes and subsequently firing it at 200° C. for 90 minutes.

Example 1

A conductive composition was obtained by adding 5 parts by weight of the polyfunctional epoxy resin component A and 20 parts by weight of butyl carbitol (manufactured by Wako Pure Chemical Industries, Ltd.) as a solvent to 100 parts by weight of the silver flake 1, followed by kneading by a three-roll. Then, for the resulting conductive composition, resistivity and shear strength were measured.

Example 2

A conductive composition was obtained in the same manner as in Example 1 except that the polyfunctional epoxy resin component A was used in an amount of 10 parts by weight instead of 5 parts by weight in Example 1. Then, for the resulting conductive composition, resistivity, shear strength and thermal conductivity were measured.

Example 3

A conductive composition was obtained in the same manner as in Example 1 except that the polyfunctional epoxy resin component A was used in an amount of 20 parts by weight instead of 5 parts by weight in Example 1. Then, for the resulting conductive composition, resistivity and shear strength were measured.

Example 4

A conductive composition was obtained in the same manner as in Example 2 except that 100 parts by weight of the silver flake 2 was used instead of 100 parts by weight of the silver flake 1 in Example 2. Then, for the resulting conductive composition, resistivity and shear strength were measured.

Example 5

A conductive composition was obtained in the same manner as in Example 2 except that 100 parts by weight of the silver flake 3 was used instead of 100 parts by weight of the silver flake 1 in Example 2. Then, for the resulting conductive composition, resistivity and shear strength were measured.

Example 6

A conductive composition was obtained in the same manner as in Example 2 except that 100 parts by weight of the silver flake 4 was used instead of 100 parts by weight of the silver flake 1 in Example 2. Then, for the resulting conductive composition, resistivity and shear strength were measured.

Example 7

A conductive composition was obtained in the same manner as in Example 2 except that 100 parts by weight of the silver flake 5 was used instead of 100 parts by weight of the silver flake 1 in Example 2. Then, for the resulting conductive composition, resistivity, shear strength and thermal conductivity were measured.

Example 8

A conductive composition was obtained in the same manner as in Example 2 except that 100 parts by weight of the silver flake 6 was used instead of 100 parts by weight of the silver flake 1 in Example 2. Then, for the resulting conductive composition, resistivity was measured.

Example 9

A conductive composition was obtained in the same manner as in Example 2 except that 100 parts by weight of the silver flake 7 was used instead of 100 parts by weight of the silver flake 1 in Example 2. Then, for the resulting conductive composition, resistivity was measured.

Example 10

A conductive composition was obtained by adding 10 parts by weight of the polyfunctional epoxy resin component A, 9 parts by weight of a silver nanoparticle (manufactured by Mitsuboshi Belting Ltd., "MDot-SLP", average particle diameter by electron microscopy observation: 50 nm), and 15 parts by weight of butyl carbitol (manufactured by Wako Pure Chemical Industries, Ltd.) as a solvent to 100 parts by weight of the silver flake 1, followed by kneading by a three-roll. Then, for the resulting conductive composition, resistivity, shear strength and thermal conductivity were measured.

Example 11

A conductive composition was obtained in the same manner as in Example 10 except that the polyfunctional epoxy resin component A was used in an amount of 5 parts by weight instead of 10 parts by weight and butyl carbitol was used in an amount of 20 parts by weight instead of 15 parts by weight in Example 10. Then, for the resulting conductive composition, resistivity, shear strength and thermal conductivity were measured.

Example 12

A conductive composition was obtained in the same manner as in Example 1 except that 5 parts by weight of the polyfunctional epoxy resin component A was changed to 10 parts by weight of the polyfunctional epoxy resin component B in Example 1. Then, for the resulting conductive composition, resistivity and shear strength were measured.

Example 13

A conductive composition was obtained in the same manner as in Example 1 except that 5 parts by weight of the polyfunctional epoxy resin component A was changed to 10 parts by weight of the polyfunctional epoxy resin component C in Example 1. Then, for the resulting conductive composition, resistivity and shear strength were measured.

Example 14

A conductive composition was obtained in the same manner as in Example 1 except that 5 parts by weight of the polyfunctional epoxy resin component A was changed to 10 parts by weight of the polyfunctional epoxy resin component D in Example 1. Then, for the resulting conductive composition, resistivity and shear strength were measured.

Example 15

A conductive composition was obtained in the same manner as in Example 1 except that 5 parts by weight of the polyfunctional epoxy resin component A was changed to 10 parts by weight of the polyfunctional epoxy resin component E in Example 1. Then, for the resulting conductive composition, resistivity and shear strength were measured.

Example 16

A conductive composition was obtained in the same manner as in Example 1 except that 5 parts by weight of the polyfunctional epoxy resin component A was changed to 5 parts by weight of the polyfunctional epoxy resin component F in Example 1. Then, for the resulting conductive composition, resistivity and shear strength were measured.

Example 17

A conductive composition was obtained in the same manner as in Example 1 except that 5 parts by weight of the polyfunctional epoxy resin component A was changed to 10 parts by weight of the polyfunctional epoxy resin component F in Example 1. Then, for the resulting conductive composition, resistivity and shear strength were measured.

Example 18

A conductive composition was obtained in the same manner as in Example 1 except that 5 parts by weight of the polyfunctional epoxy resin component A was changed to 20 parts by weight of the polyfunctional epoxy resin component F in Example 1. Then, for the resulting conductive composition, resistivity and shear strength were measured.

Example 19

A conductive composition was obtained in the same manner as in Example 1 except that 5 parts by weight of the polyfunctional epoxy resin component A was changed to 5 parts by weight of the polyfunctional epoxy resin component G in Example 1. Then, for the resulting conductive composition, resistivity and shear strength were measured.

Example 20

A conductive composition was obtained in the same manner as in Example 1 except that 5 parts by weight of the polyfunctional epoxy resin component A was changed to 10 parts by weight of the polyfunctional epoxy resin component G in Example 1. Then, for the resulting conductive composition, resistivity and shear strength were measured.

Example 21

A conductive composition was obtained in the same manner as in Example 1 except that 5 parts by weight of the polyfunctional epoxy resin component A was changed to 20 parts by weight of the polyfunctional epoxy resin component G in Example 1. Then, for the resulting conductive composition, resistivity and shear strength were measured.

Example 22

A conductive composition was obtained in the same manner as in Example 1 except that 5 parts by weight of the polyfunctional epoxy resin component A was changed to 5 parts by weight of the polyfunctional epoxy resin component H in Example 1. Then, for the resulting conductive composition, resistivity and shear strength were measured.

Example 23

A conductive composition was obtained in the same manner as in Example 1 except that 5 parts by weight of the polyfunctional epoxy resin component A was changed to 10 parts by weight of the polyfunctional epoxy resin component H in Example 1. Then, for the resulting conductive composition, resistivity and shear strength were measured.

Example 24

A conductive composition was obtained in the same manner as in Example 1 except that 5 parts by weight of the polyfunctional epoxy resin component A was changed to 20 parts by weight of the polyfunctional epoxy resin component H in Example 1. Then, for the resulting conductive composition, resistivity and shear strength were measured.

Example 25

A conductive composition was obtained in the same manner as in Example 1 except that 5 parts by weight of the polyfunctional epoxy resin component A was changed to 5 parts by weight of the polyfunctional epoxy resin component I in Example 1. Then, for the resulting conductive composition, resistivity and shear strength were measured.

Example 26

A conductive composition was obtained in the same manner as in Example 1 except that 5 parts by weight of the polyfunctional epoxy resin component A was changed to 10 parts by weight of the polyfunctional epoxy resin component I in Example 1. Then, for the resulting conductive composition, resistivity and shear strength were measured.

Example 27

A conductive composition was obtained in the same manner as in Example 1 except that 5 parts by weight of the polyfunctional epoxy resin component A was changed to 20 parts by weight of the polyfunctional epoxy resin component I in Example 1. Then, for the resulting conductive composition, resistivity and shear strength were measured.

Example 28

A conductive composition was obtained in the same manner as in Example 1 except that 5 parts by weight of the polyfunctional epoxy resin component A was changed to 5 parts by weight of the polyfunctional epoxy resin component J in Example 1. Then, for the resulting conductive composition, resistivity and shear strength were measured.

Example 29

A conductive composition was obtained in the same manner as in Example 1 except that 5 parts by weight of the polyfunctional epoxy resin component A was changed to 10 parts by weight of the polyfunctional epoxy resin component J in Example 1. Then, for the resulting conductive composition, resistivity and shear strength were measured.

Example 30

A conductive composition was obtained in the same manner as in Example 1 except that 5 parts by weight of the polyfunctional epoxy resin component A was changed to 20 parts by weight of the polyfunctional epoxy resin component J in Example 1. Then, for the resulting conductive composition, resistivity and shear strength were measured.

Example 31

A conductive composition was obtained in the same manner as in Example 1 except that 5 parts by weight of the polyfunctional epoxy resin component A was changed to 5 parts by weight of the polyfunctional epoxy resin component K in Example 1. Then, for the resulting conductive composition, resistivity and shear strength were measured.

Example 32

A conductive composition was obtained in the same manner as in Example 1 except that 5 parts by weight of the polyfunctional epoxy resin component A was changed to 10 parts by weight of the polyfunctional epoxy resin component K in Example 1. Then, for the resulting conductive composition, resistivity and shear strength were measured.

Example 33

A conductive composition was obtained in the same manner as in Example 1 except that 5 parts by weight of the polyfunctional epoxy resin component A was changed to 20 parts by weight of the polyfunctional epoxy resin component K in Example 1. Then, for the resulting conductive composition, resistivity and shear strength were measured.

Example 34

A conductive composition was obtained in the same manner as in Example 1 except that 5 parts by weight of the polyfunctional epoxy resin component A was changed to 5 parts by weight of the polyfunctional epoxy resin component L in Example 1. Then, for the resulting conductive composition, resistivity and shear strength were measured.

Example 35

A conductive composition was obtained in the same manner as in Example 1 except that 5 parts by weight of the polyfunctional epoxy resin component A was changed to 10 parts by weight of the polyfunctional epoxy resin component L in Example 1. Then, for the resulting conductive composition, resistivity and shear strength were measured.

Example 36

A conductive composition was obtained in the same manner as in Example 1 except that 5 parts by weight of the polyfunctional epoxy resin component A was changed to 20 parts by weight of the polyfunctional epoxy resin component L in Example 1. Then, for the resulting conductive composition, resistivity and shear strength were measured.

Example 37

A conductive composition was obtained in the same manner as in Example 1 except that 5 parts by weight of the polyfunctional epoxy resin component A was changed to 5 parts by weight of the polyfunctional epoxy resin component M in Example 1. Then, for the resulting conductive composition, resistivity and shear strength were measured.

Example 38

A conductive composition was obtained in the same manner as in Example 1 except that 5 parts by weight of the polyfunctional epoxy resin component A was changed to 10 parts by weight of the polyfunctional epoxy resin component M in Example 1. Then, for the resulting conductive composition, resistivity and shear strength were measured.

Example 39

A conductive composition was obtained in the same manner as in Example 1 except that 5 parts by weight of the polyfunctional epoxy resin component A was changed to 20 parts by weight of the polyfunctional epoxy resin component M in Example 1. Then, for the resulting conductive composition, resistivity and shear strength were measured.

Example 40

A conductive composition was obtained in the same manner as in Example 1 except that 100 parts by weight of the silver flake 8 was used instead of 100 parts by weight of the silver flake 1 in Example 1. Then, for the resulting conductive composition, resistivity and shear strength were measured.

Example 41

A conductive composition was obtained in the same manner as in Example 1 except that 100 parts by weight of the silver flake 8 was used instead of 100 parts by weight of the silver flake 1 and the polyfunctional epoxy resin component A was used in an amount of 10 parts by weight instead of 5 parts by weight in Example 1. Then, for the resulting conductive composition, resistivity and shear strength were measured.

Example 42

A conductive composition was obtained in the same manner as in Example 1 except that 100 parts by weight of the silver flake 8 was used instead of 100 parts by weight of the silver flake 1 and the polyfunctional epoxy resin component A was used in an amount of 20 parts by weight instead of 5 parts by weight in Example 1. Then, for the resulting conductive composition, resistivity and shear strength were measured.

Example 43

A conductive composition was obtained in the same manner as in Example 1 except that the polyfunctional epoxy resin component A was used in an amount of 25 parts by weight instead of 5 parts by weight in Example 1. Then, for the resulting conductive composition, resistivity and shear strength were measured.

Comparative Example 1

A conductive composition was obtained in the same manner as in Example 1 except that 5 parts by weight of the polyfunctional epoxy resin component A was changed to 5 parts by weight of the bifunctional epoxy resin component in Example 1. Then, for the resulting conductive composition, resistivity and shear strength were measured.

Comparative Example 2

A conductive composition was obtained in the same manner as in Example 1 except that 5 parts by weight of the polyfunctional epoxy resin component A was changed to 10 parts by weight of the bifunctional epoxy resin component in Example 1. Then, for the resulting conductive composition, resistivity and shear strength were measured.

Comparative Example 3

A conductive composition was obtained in the same manner as in Example 1 except that 5 parts by weight of the polyfunctional epoxy resin component A was changed to 20 parts by weight of the bifunctional epoxy resin component in Example 1. Then, for the resulting conductive composition, resistivity and shear strength were measured. Incidentally, it was not able to measure the resistivity because it was too large.

Comparative Example 4

A conductive composition was obtained in the same manner as in Example 1 except that 5 parts by weight of the polyfunctional epoxy resin component A was changed to 28.9 parts by weight of the polyester resin solution (i.e., 10 parts by weight of the polyester resin) and butyl carbitol was changed from 20 parts by weight to 11 parts by weight in Example 1. Then, for the resulting conductive composition, resistivity and shear strength were measured.

The results are shown in Tables 1 to 3. Incidentally, in Tables 1 to 3, "polyfunctional" means an abbreviation of "polyfunctional epoxy resin component", "bifunctional" means an abbreviation of "bifunctional epoxy resin component", and "polyester" means an abbreviation of "polyester resin". Also, in Table 1, the values of thermal conductivity in parentheses are measured values.

TABLE 1

| | | Silver flake (100 parts by weight) | | | | Silver nanoparticle part by weight | Resin component Type/part by weight | Resistivity µΩ·cm | Shear strength N | Thermal conductivity W/m·K |
|---|---|---|---|---|---|---|---|---|---|---|
| | Type | Average particle diameter µm | Specific surface area m²/g | Tap density g/cm³ | (Average particle diameter) × (Specific surface area)² | | | | | |
| Example 1 | 1 | 1.6 | 2.5 | 2.6 | 10.0 | — | Polyfunctional A/5 | 6.5 | 163 | 111.9 |
| Example 2 | 1 | 1.6 | 2.5 | 2.6 | 10.0 | — | Polyfunctional A/10 | 7.2 | 163 | 101.0 (47.2) |
| Example 3 | 1 | 1.6 | 2.5 | 2.6 | 10.0 | — | Polyfunctional A/20 | 31 | 121 | 23.5 |
| Example 4 | 2 | 1.2 | 2.7 | 2.5 | 8.7 | — | Polyfunctional A/10 | 6.8 | 155 | 106.9 |
| Example 5 | 3 | 4.3 | 1.5 | 2.1 | 9.6 | — | Polyfunctional A/10 | 8.1 | 131 | 89.8 |
| Example 6 | 4 | 5.1 | 1.5 | 1.6 | 11.5 | — | Polyfunctional A/10 | 10.7 | 123 | 68.0 |
| Example 7 | 5 | 1.5 | 1.8 | 2.3 | 4.9 | — | Polyfunctional A/10 | 12.8 | 85 | 56.8 (33.5) |
| Example 8 | 6 | 4.0 | 2.7 | 0.8 | 29.2 | — | Polyfunctional A/10 | 16.3 | — | 44.6 |
| Example 9 | 7 | 6.0 | 1.9 | 0.6 | 21.7 | — | Polyfunctional A/10 | 14.6 | — | 49.8 |
| Example 10 | 1 | 1.6 | 2.5 | 2.6 | 10.0 | 9 | Polyfunctional A/10 | 6.3 | 115 | 115.4 (49.3) |
| Example 11 | 1 | 1.6 | 2.5 | 2.6 | 10.0 | 9 | Polyfunctional A/5 | 5.5 | 124 | 132.2 (56.4) |
| Example 12 | 1 | 1.6 | 2.5 | 2.6 | 10.0 | — | Polyfunctional B/10 | 9.6 | 166 | 75.7 |
| Example 13 | 1 | 1.6 | 2.5 | 2.6 | 10.0 | — | Polyfunctional C/10 | 6.7 | 171 | 108.5 |
| Example 14 | 1 | 1.6 | 2.5 | 2.6 | 10.0 | — | Polyfunctional D/10 | 7.8 | 109 | 93.2 |
| Example 15 | 1 | 1.6 | 2.5 | 2.6 | 10.0 | — | Polyfunctional E/10 | 15.2 | 181 | 47.8 |

TABLE 2

| | Silver flake (100 parts by weight) | | | | | | | | |
|---|---|---|---|---|---|---|---|---|---|
| | Type | Average particle diameter μm | Specific surface area m²/g | Tap density g/cm³ | (Average particle diameter) × (Specific surface area)² | Silver nanoparticle part by weight | Resin component Type/part by weight | Resistivity μΩ·cm | Shear strength N | Thermal conductivity W/m·K |
| Example 16 | 1 | 1.6 | 2.5 | 2.6 | 10.0 | — | Polyfunctional F/5 | 12.5 | 41 | 58.2 |
| Example 17 | 1 | 1.6 | 2.5 | 2.6 | 10.0 | — | Polyfunctional F/10 | 24.1 | 47 | 30.2 |
| Example 18 | 1 | 1.6 | 2.5 | 2.6 | 10.0 | — | Polyfunctional F/20 | 45 | 119 | 16.2 |
| Example 19 | 1 | 1.6 | 2.5 | 2.6 | 10.0 | — | Polyfunctional G/5 | 9.5 | 23 | 76.5 |
| Example 20 | 1 | 1.6 | 2.5 | 2.6 | 10.0 | — | Polyfunctional G/10 | 22.1 | 73 | 32.9 |
| Example 21 | 1 | 1.6 | 2.5 | 2.6 | 10.0 | — | Polyfunctional G/20 | 29.5 | 231 | 24.6 |
| Example 22 | 1 | 1.6 | 2.5 | 2.6 | 10.0 | — | Polyfunctional H/5 | 9.4 | 42 | 77.4 |
| Example 23 | 1 | 1.6 | 2.5 | 2.6 | 10.0 | — | Polyfunctional H/10 | 15.6 | 52 | 46.6 |
| Example 24 | 1 | 1.6 | 2.5 | 2.6 | 10.0 | — | Polyfunctional H/20 | 25.3 | 72 | 28.7 |
| Example 25 | 1 | 1.6 | 2.5 | 2.6 | 10.0 | — | Polyfunctional I/5 | 10.2 | 44 | 71.3 |
| Example 26 | 1 | 1.6 | 2.5 | 2.6 | 10.0 | — | Polyfunctional I/10 | 21.5 | 73 | 33.8 |
| Example 27 | 1 | 1.6 | 2.5 | 2.6 | 10.0 | — | Polyfunctional I/20 | 36.4 | 113 | 20.0 |
| Comparative Example 1 | 1 | 1.6 | 2.5 | 2.6 | 10.0 | — | Bifunctional/5 | 57.0 | 23 | 12.8 |
| Comparative Example 2 | 1 | 1.6 | 2.5 | 2.6 | 10.0 | — | Bifunctional/10 | 147 | 64 | 4.9 |
| Comparative Example 3 | 1 | 1.6 | 2.5 | 2.6 | 10.0 | — | Bifunctional 20 | Impossible to measure | 212 | — |
| Comparative Example 4 | 1 | 1.6 | 2.5 | 2.6 | 10.0 | — | Polyester/10 | 383 | 123 | 1.9 |

TABLE 3

| | Silver flake (100 parts by weight) | | | | | | | | |
|---|---|---|---|---|---|---|---|---|---|
| | Type | Average particle diameter μm | Specific surface area m²/g | Tap density g/cm³ | (Average particle diameter) × (Specific surface area)² | Silver nanoparticle part by weight | Resin component Type/part by weight | Resistivity μΩ·cm | Shear strength N | Thermal conductivity W/m·K |
| Example 28 | 1 | 1.6 | 2.5 | 2.6 | 10.0 | — | Polyfunctional J/5 | 10.1 | 74.1 | 72.0 |
| Example 29 | 1 | 1.6 | 2.5 | 2.6 | 10.0 | — | Polyfunctional J/10 | 17.2 | 54.5 | 42.3 |
| Example 30 | 1 | 1.6 | 2.5 | 2.6 | 10.0 | — | Polyfunctional J/20 | 82.3 | 207.1 | 8.8 |
| Example 31 | 1 | 1.6 | 2.5 | 2.6 | 10.0 | — | Polyfunctional K/5 | 8.2 | 103.8 | 88.7 |
| Example 32 | 1 | 1.6 | 2.5 | 2.6 | 10.0 | — | Polyfunctional K/10 | 6.5 | 99.2 | 111.9 |
| Example 33 | 1 | 1.6 | 2.5 | 2.6 | 10.0 | — | Polyfunctional K/20 | 58.1 | 100.2 | 12.5 |
| Example 34 | 1 | 1.6 | 2.5 | 2.6 | 10.0 | — | Polyfunctional L/5 | 8.1 | 85.6 | 89.8 |
| Example 35 | 1 | 1.6 | 2.5 | 2.6 | 10.0 | — | Polyfunctional L/10 | 7.0 | 191.5 | 103.9 |
| Example 36 | 1 | 1.6 | 2.5 | 2.6 | 10.0 | — | Polyfunctional L/20 | 25.5 | 125.2 | 28.5 |
| Example 37 | 1 | 1.6 | 2.5 | 2.6 | 10.0 | — | Polyfunctional M/5 | 8.8 | 120.1 | 82.6 |
| Example 38 | 1 | 1.6 | 2.5 | 2.6 | 10.0 | — | Polyfunctional M/10 | 7.7 | 174.2 | 94.4 |
| Example 39 | 1 | 1.6 | 2.5 | 2.6 | 10.0 | — | Polyfunctional M/20 | 30.3 | 125.7 | 24.0 |
| Example 40 | 8 | 1.2 | 3.8 | 2.6 | 17.3 | — | Polyfunctional A/5 | 6.4 | 92 | 113.6 |
| Example 41 | 8 | 1.2 | 3.8 | 2.6 | 17.3 | — | Polyfunctional A/10 | 8.2 | 125 | 88.7 |
| Example 42 | 8 | 1.2 | 3.8 | 2.6 | 17.3 | — | Polyfunctional A/20 | 16.5 | 121 | 44.1 |
| Example 43 | 1 | 1.6 | 2.5 | 2.6 | 10.0 | — | Polyfunctional A/25 | 66.4 | 131.2 | 11.0 |

While the invention has been described in detail and with reference to specific embodiments thereof, it will be apparent to one skilled in the art that various changes and modifications can be made therein without departing from the spirit and scope of the present invention.

The present application is based on Japanese Patent Application No. 2012-215007 filed on Sep. 27, 2012 and Japanese Patent Application No. 2012-252057 filed on Nov. 16, 2012, and the contents thereof are incorporated herein by reference.

INDUSTRIAL APPLICABILITY

Since the conductive composition of the present invention can realize high conductivity, it can be utilized in various use applications, for example, as a composition for forming wiring, circuits, electrodes, and the like and as a conductive adhesive and the like. Particularly, since the conductive composition can realize high conductivity and heat radiation property without impairing high close contact, it is suitable as a conductive adhesive for bonding two base materials each other.

The invention claimed is:

1. A conductive composition comprising a conductive metal powder and an epoxy resin component,
   wherein the conductive metal powder comprises a metal flake and the epoxy resin component comprises a polyfunctional epoxy resin having three or more epoxy groups, and
   when the average particle diameter of the metal flake is taken as A (μm) and the BET specific surface area of the metal flake is taken as B (m²/g), the value of A×B² is from 7 to 18.

2. The conductive composition according to claim 1, wherein the metal flake has an average particle diameter of 0.7 to 10 μm, a BET specific surface area of 1 to 5 m²/g, and a tap density of 0.5 to 4.5 g/cm³.

3. The conductive composition according to claim 1, wherein the metal flake has an average particle diameter of 0.5 to 3.5 μm, a BET specific surface area of 1 to 4.5 m²/g, and a tap density of 1.2 to 3.5 g/cm³.

4. The conductive composition according to claim 1, wherein the metal flake is a flaked product of an aggregated powder of a spherical metal fine particle.

5. The conductive composition according to claim 1, wherein the conductive metal powder further comprises a spherical metal nanoparticle.

6. The conductive composition according to claim 5, wherein the ratio of the metal flake to the spherical metal nanoparticle is as follows: the former/the latter (weight ratio)=99/1 to 50/50.

7. The conductive composition according to claim 1, wherein the polyfunctional epoxy resin is an aromatic epoxy resin.

8. The conductive composition according to claim 1, wherein the polyfunctional epoxy resin has an epoxy equivalent of 350 g/eq or less.

9. The conductive composition according to claim 1, wherein the polyfunctional epoxy resin is a glycidyl ether type aromatic epoxy resin having an epoxy equivalent of 140 to 320 g/eq.

10. The conductive composition according to claim 1, wherein the epoxy resin component comprises a curing agent composed of an aromatic amine-based curing agent.

11. The conductive composition according to any claim 1, wherein the ratio of the conductive metal powder to the epoxy resin component is as follows: the former/the latter (weight ratio)=99/1 to 50/50.

12. The conductive composition according to claim 1, which is a conductive adhesive.

13. The conductive composition according to claim 1, which is a conductive adhesive for bonding a lead frame with a semiconductor chip.

14. A conductive molded body comprising at least a conductive region formed of the conductive composition described in claim 1.

15. The conductive molded body according to claim 14, which is a molded body comprising a conjugated base material composed of two base materials and a conductive adhesive that intervenes between the base materials and bonds the two base materials each other,
wherein the conductive adhesive is formed of a conductive composition comprising a conductive metal powder and an epoxy resin component, wherein the conductive metal powder comprises a metal flake, and the epoxy resin component comprises a polyfunctional epoxy resin having three or more epoxy groups, and
when the average particle diameter of the metal flake is taken as A (μm) and the BET specific surface area of the metal flake is taken as B (m²/g), the value of A×B² is from 7 to 18.

* * * * *